(12) United States Patent
Miyashita

(10) Patent No.: US 11,008,985 B2
(45) Date of Patent: May 18, 2021

(54) CONTROL DEVICE FOR INTERNAL COMBUSTION ENGINE

(71) Applicant: TOYOTA JIDOSHA KABUSHIKI KAISHA, Toyota (JP)

(72) Inventor: Shigeki Miyashita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/255,479

(22) Filed: Jan. 23, 2019

(65) Prior Publication Data

US 2019/0293035 A1 Sep. 26, 2019

(30) Foreign Application Priority Data

Mar. 20, 2018 (JP) .............................. JP2018-053198

(51) Int. Cl.
| | |
|---|---|
| *F02M 25/10* | (2006.01) |
| *F02M 35/10* | (2006.01) |
| *F02D 41/00* | (2006.01) |
| *F02B 39/10* | (2006.01) |
| *F02M 26/03* | (2016.01) |
| *F02D 9/02* | (2006.01) |

(52) U.S. Cl.
CPC ....... *F02M 35/10222* (2013.01); *F02B 39/10* (2013.01); *F02D 9/02* (2013.01); *F02D 41/0007* (2013.01); *F02D 41/0052* (2013.01); *F02D 41/0077* (2013.01); *F02M 26/03* (2016.02); *F02M 35/10006* (2013.01); *F02M 35/10157* (2013.01); *F02M 35/10255* (2013.01); *F02D 2200/04* (2013.01)

(58) Field of Classification Search
CPC ......................... F02M 26/03; F02M 35/10222
USPC ........................................ 123/559.1, 568.16
See application file for complete search history.

(56) References Cited

U.S. PATENT DOCUMENTS

| | | | | |
|---|---|---|---|---|
| 5,577,385 | A * | 11/1996 | Kapich | .................. F02B 33/34 60/612 |
| 7,328,684 | B2 * | 2/2008 | Saito | ..................... F02B 17/005 123/299 |
| 2001/0017033 | A1 * | 8/2001 | McKinley | .............. F02M 26/23 60/605.2 |

(Continued)

FOREIGN PATENT DOCUMENTS

JP 2016-050517 A 4/2016

*Primary Examiner* — Patrick Hamo
*Assistant Examiner* — Wesley G Harris
(74) *Attorney, Agent, or Firm* — Oliff PLC

(57) ABSTRACT

An internal combustion engine is provided with: an electric supercharger including an electric compressor; an EGR introduction port formed upstream of the electric compressor; a throttle valve A arranged upstream of the EGR introduction port; and a control device. A throttle valve B other than the throttle valve A is not arranged in the intake air passage. The control device is configured, in a non-supercharging region, to execute a first air flow rate adjustment processing that adjusts an intake air flow rate by adjusting the opening degree of the throttle valve A while driving the electric supercharger to cause a pressure ratio of the electric compressor to approach 1; and a second air flow rate adjustment processing that adjusts the intake air flow rate by adjusting the opening degree of the throttle valve A while not energizing the electric supercharger.

8 Claims, 11 Drawing Sheets

(56) References Cited

U.S. PATENT DOCUMENTS

| | | | |
|---|---|---|---|
| 2002/0195086 A1* | 12/2002 | Beck | F02D 41/1475 |
| | | | 123/435 |
| 2004/0019424 A1* | 1/2004 | Beauerle | F02D 41/0007 |
| | | | 701/102 |
| 2006/0207252 A1* | 9/2006 | Isobe | F02D 23/02 |
| | | | 60/601 |
| 2008/0133110 A1* | 6/2008 | Vetrovec | F02D 41/10 |
| | | | 701/103 |
| 2012/0297767 A1* | 11/2012 | Hofbauer | F02M 26/46 |
| | | | 60/605.2 |
| 2016/0363043 A1* | 12/2016 | Hirayama | F02B 33/40 |

* cited by examiner

Fig. 2

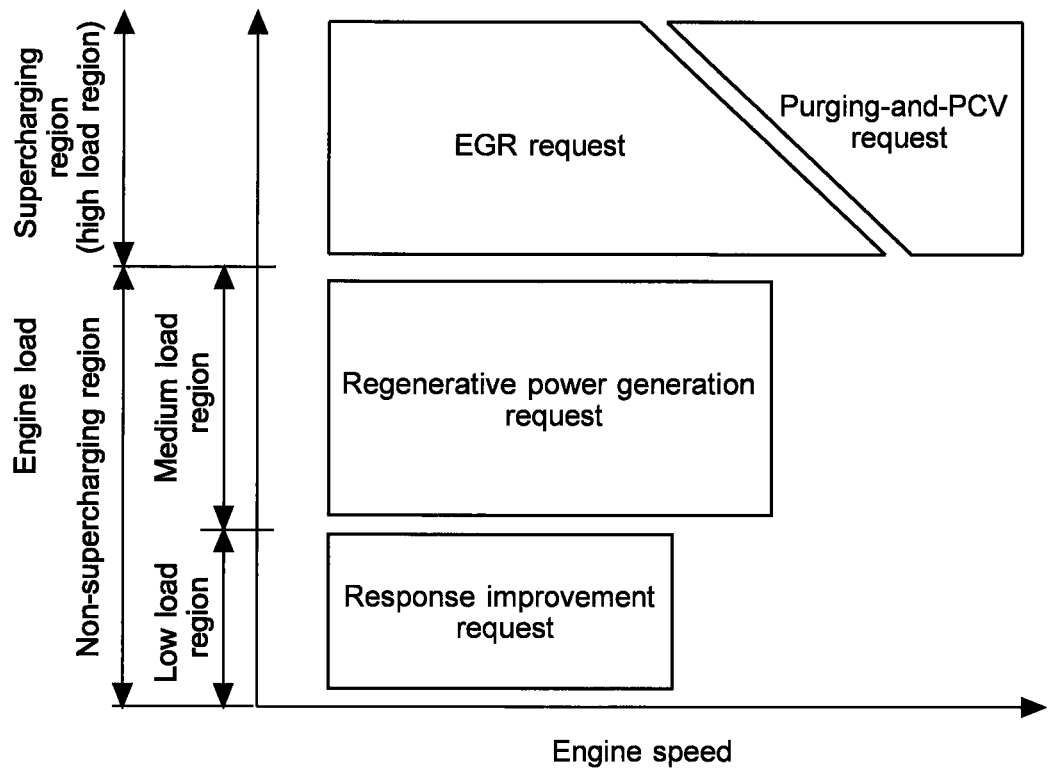

Fig. 3

| Engine load region | Purpose | Target of Intake air pressure | Throttle valve | Electric compressor |
|---|---|---|---|---|
| Low | Increase of compressor rotational speed NC for improvement of response | Strong-negative-pressure state | Closed | Non-energization or drive |
| Medium | Maximization of amount of regenerative power generation | Maximization of pressure difference | Open | Power generation |
| High | Securement of EGR gas flow rate, or purge gas flow rate and blow-by gas flow rate | Proper negative pressure | Slightly closed | Drive |

Torque Request

Response Improvement Request

Regenerative Power Generation Request

EGR Request

Purging-and-PCV Request

Comparative Example

CONTROL DEVICE FOR INTERNAL COMBUSTION ENGINE

CROSS-REFERENCE TO RELATED APPLICATION

This application is based on and claims the benefit of Japanese Patent Application No. 2018-053198, filed on Mar. 20, 2018, which is incorporated by reference herein in its entirety.

BACKGROUND

Technical Field

The present disclosure relates to an internal combustion engine, and more particularly to a supercharged internal combustion engine configured to perform an exhaust gas recirculation ("EGR") operation.

Background Art

For example, JP 2016-050517 A discloses a supercharged internal combustion engine configured to perform an EGR operation. This internal combustion engine is provided with an electric supercharger including a compressor (i.e., electric compressor) and a turbo-supercharger as its superchargers, and two types of EGR devices (i.e., low pressure loop (LPL) type EGR device and high pressure loop (HPL) type EGR device).

In more detail, according to the internal combustion engine described above, the electric compressor is arranged at a portion of an intake air passage located on the upstream side of a compressor of the turbo-supercharger. An EGR introduction port of the LPL type EGR device is provided at a portion of the intake air passage located on the upstream side of the electric compressor. The internal combustion engine is further provided with two (first and second) throttle valves. The first throttle valve is arranged upstream of this EGR introduction port, and the second throttle valve is arranged downstream of the compressor of the turbo-supercharger.

Furthermore, in the internal combustion engine described above, when, in the view of the internal combustion engine from the axial direction of a cylinder, the side of an intake port is referred to as an intake side of the cylinder and the side opposite to the intake side with respect to the center of the cylinder is referred to as an exhaust side thereof, the first throttle valve, the EGR introduction port and the two compressors are arranged at the exhaust side.

SUMMARY

According to the internal combustion engine disclosed in JP 2016-050517 A, the EGR introduction port is arranged at the portion of the intake air passage located on the upstream side of the electric compressor, and the throttle valve (i.e., first throttle valve) is arranged upstream of this EGR introduction port. Thus, according to the internal combustion engine having this kind of configuration, a high concentration of EGR gas can be introduced in a supercharging region by reducing the opening degree of the throttle valve.

However, providing two throttle valves for an engine control similarly to the internal combustion engine described above becomes a factor for an increase of cost. In addition, it is favorable that, when transitioning from a non-supercharging region to the supercharging region in response to a torque increase request from the driver, control of intake air flow rate (i.e., fresh air flow rate) in the non-supercharging region can increase a supercharging response (i.e., response of increase of engine speed).

The present disclosure has been made to address the problem described above, and an object of the present disclosure is to provide a supercharged internal combustion engine configured to perform an EGR operation, which can achieve both cost reduction and improvement of supercharging response in transitioning from a non-supercharging region to a supercharging region.

An internal combustion engine according to the present disclosure includes: an electric supercharger including an electric compressor arranged in an intake air passage; an EGR introduction port formed at a portion of the intake air passage located on an upstream side of the electric compressor; a throttle valve A arranged in a portion of the intake air passage located on an upstream side of the EGR introduction port; and a control device configured to control the electric supercharger and the throttle valve A. A throttle valve B other than the throttle valve A is not arranged in the intake air passage. The control device is configured, in a non-supercharging region in which an outlet pressure of the electric compressor is lower than or equal to an atmospheric air pressure, to execute at least one of: a first air flow rate adjustment processing that adjusts an intake air flow rate by adjusting an opening degree of the throttle valve A while driving the electric supercharger to cause a pressure ratio of the electric compressor to approach 1; and a second air flow rate adjustment processing that adjusts the intake air flow rate by adjusting the opening degree of the throttle valve A while not energizing the electric supercharger.

When, in a view of the internal combustion engine from an axial direction of a cylinder, a side of an intake port is referred to as an intake side of the cylinder and a side opposite to the intake side with respect to the center of the cylinder is referred to as an exhaust side of the cylinder, the electric supercharger and the EGR introduction port may be arranged on the intake side. The electric supercharger may not use exhaust gas of the internal combustion engine as a power of the electric supercharger. The internal combustion engine may not include a supercharger other than the electric supercharger.

The throttle valve A may be arranged on the intake side as well as the electric compressor and the EGR introduction port.

The non-supercharging region may include: at least one of a first region in which the first air flow rate adjustment processing is executed and a second region in which the second air flow rate adjustment processing is executed; and a regenerative power generation region which is located on a high-load side relative to the first region and the second region and in which regenerative power generation using the electric supercharger is performed. The control device may be configured, in the regenerative power generation region, to adjust an opening degree of the throttle valve A and power regeneration load of the electric supercharger to adjust the intake air flow rate.

The non-supercharging region may include the first region, the second region and the regenerative power generation region in order from a low-load side.

The internal combustion engine may include an EGR valve configured to open and close an EGR passage provided with the EGR introduction port as an end of the EGR passage. The control device may be configured, during use of the non-supercharging region, to: where an EGR closing condition that the EGR valve is closed is met and a temperature correlation value correlated with a temperature of a gas at an EGR convergence portion at which EGR gas introduced from the EGR introduction port into the intake air passage converges with intake air is greater than or equal to a threshold value, execute the first air flow rate adjustment processing or the second air flow rate adjustment processing; and where the EGR closing condition is met and the temperature correlation value is smaller than the threshold value, execute a third air flow rate adjustment processing that adjusts the opening degree of the throttle valve A so as to become greater than an opening degree used when the temperature correlation value is greater than or equal to the threshold value under a same engine load and that applies, to the electric supercharger, the power regeneration load required to reduce an increase of an in-cylinder charge air amount associated with an increase of the opening degree of the throttle valve A.

The control device may be configured, in transitioning to the regenerative power generation region from the first region or the second region, to: before applying the power regeneration load to the electric supercharger, execute a fresh air increment processing that opens the throttle valve A toward a first target opening degree required to obtain a required in-cylinder charge air amount required to achieve a required engine torque in the regenerative power generation region; and execute a regenerative power generation start processing that, after execution of the fresh air increment processing, gradually opens the throttle valve A toward a second target opening degree greater than the first target opening degree and gradually increases the power regeneration load of the electric supercharger toward a target power regeneration load while satisfying the required in-cylinder charge air amount. The second target opening degree and the target power regeneration load may be determined to maximize a pressure difference before and after the electric compressor while satisfying the required in-cylinder charge air amount.

According to the internal combustion engine of the present disclosure, in the non-supercharging region, the intake air flow rate is adjusted by adjusting the opening degree of the throttle valve A arranged upstream of the electric compressor (i.e., at least one of the first air flow rate adjustment processing and the second air flow rate adjustment processing is executed). If the opening degree of the throttle valve A arranged upstream of the electric compressor is reduced for this kind of adjustment of the intake air flow rate, the rotational speed of the electric compressor increases. Therefore, the supercharging response can be improved thereafter in transitioning to the supercharging region from the non-supercharging region. Moreover, according to the internal combustion engine of the present disclosure, a throttle valve B other than the throttle valve A is not arranged in the intake air passage. Therefore, according to the present disclosure, in a supercharged internal combustion engine configured to perform an EGR operation, cost reduction and improvement of the supercharging response can both be achieved in transitioning from the non-supercharging region to the supercharging region.

BRIEF DESCRIPTION OF THE DRAWINGS

FIG. 2 is a graph for describing requests that are given priority in the respective engine operating regions;

FIG. 3 is a table that collectively indicates a control policy of intake air pressure in the individual engine load regions;

DETAILED DESCRIPTION

Figure 1:
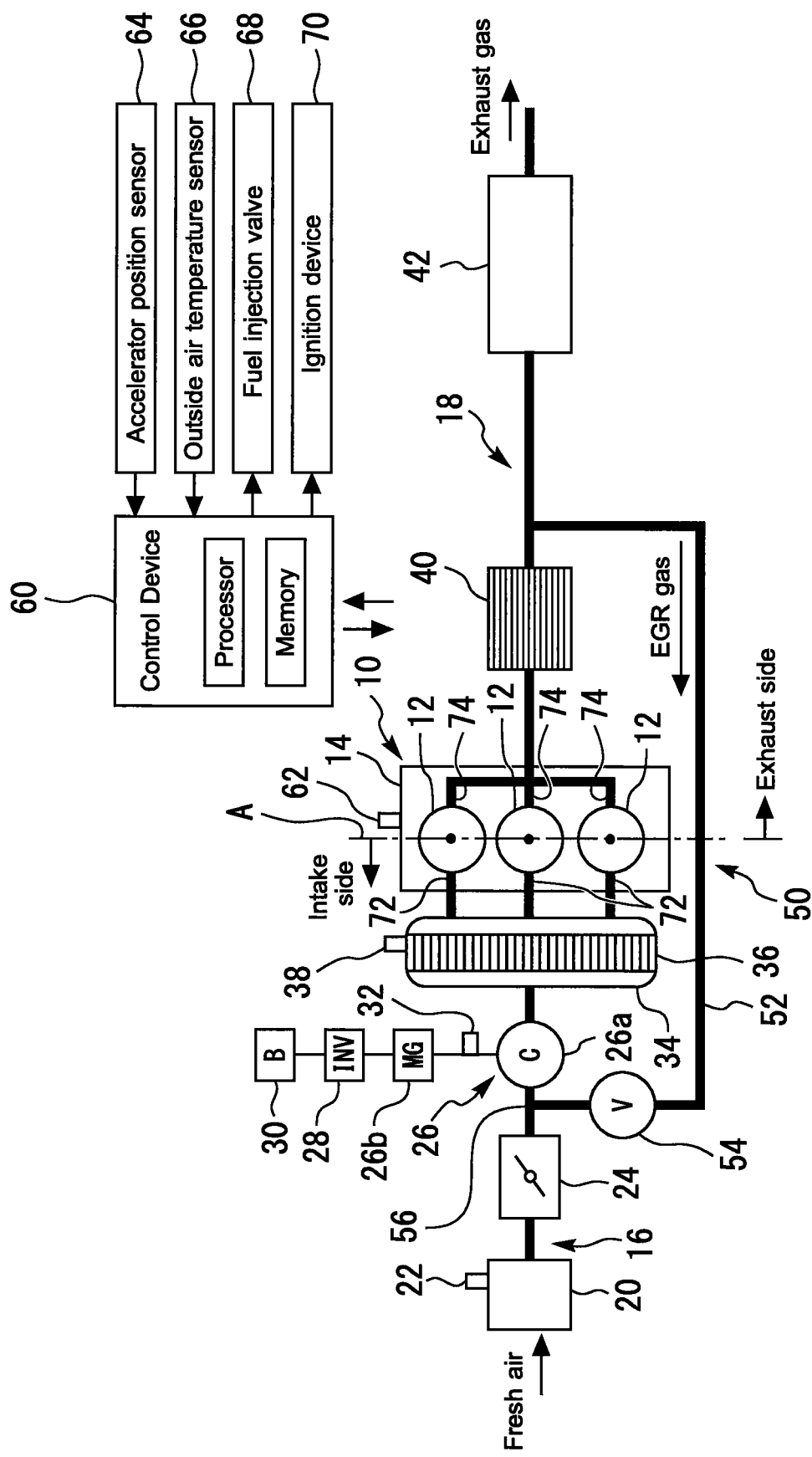
FIG. 1 is a schematic diagram for describing an example of the configuration of a system according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

Firstly, a first embodiment according to the preset disclosure will be described with reference to FIGS. 1 to 16.

1-1. Configuration of System

FIG. 1 is a schematic diagram for describing an example of the configuration of a system according to the first embodiment of the present disclosure. The system shown in FIG. 1 is provided with a spark ignition type internal combustion engine 10. It is supposed that, for example, the internal combustion engine 10 is mounted on a vehicle and used as its power source. The internal combustion engine 10 is equipped with an engine main body (mainly, cylinder head and cylinder block) 14 having three cylinders 12 aligned in a low.

An intake air passage 16 and an exhaust gas passage 18 communicate with each cylinder 12. An air cleaner 20 is installed in the vicinity of an inlet of the intake air passage 16. In the air cleaner 20, an air flow sensor 22 that outputs a signal responsive to a flow rate Ga of air (fresh air) taken into the intake air passage 16 is installed.

An electronically-controlled throttle valve 24 for opening and closing the intake air passage 16 (which corresponds to an example of the "throttle valve A" according to the present disclosure) is arranged in a portion of the intake air passage 16 located on the downstream side of the air cleaner 20. Any other throttle valves (which each correspond to an example of the "throttle valve B" according to the present disclosure) other than the throttle valve 24 are not arranged in the intake air passage 16. The intake air flow rate Ga can be controlled by performing adjustment of the opening degree of the throttle valve 24, and negative pressure can also be generated downstream of the throttle valve 24.

In the intake passage 16 at the upstream side of the throttle valve 24, a compressor 26a (hereinafter, also referred to as an "electric compressor 26a") of an electric supercharger 26 is arranged. The electric supercharger 26 is provided with a motor generator (MG) 26b for driving the electric compressor 26a. The MG 26b is an electric motor that can generate an electric power and exchanges electric power with a battery 30 via an inverter 28. In addition, the MG 26b is equipped with a compressor rotational speed sensor 32 for detecting a rotational speed NC of a rotary shaft of the MG 26b (i.e., rotational speed of the electric compressor 26a).

The electric supercharger 26 can be driven to rotate the electric compressor 26a by causing the MG 26b to function as an electric motor by the use of the electric power of the battery 30. The electric power which is stored in the battery 30 is basically generated by a generator which is not shown (for example, alternator) by using the power of the internal combustion engine 10. In addition, the electric supercharger 26 can cause the MG 26b to function as a generator by applying a power generation load (more specifically, power generation load torque), with the control of the inverter 28, to the MG 26b which is rotating. As a result, energy regeneration that converts, into electric energy, kinetic energy of intake air recovered by the electric supercharger 26a can be performed. Application of the power generation load to the MG 26b is equivalent to application of a braking force to the rotation of the electric compressor 26a which is brought about by a flow of intake air. When the power generation load is increased, the braking force to the rotation of the electric compressor 26a increases, and the generated electric power (regenerative electric power) thus increases. In addition, when the power generation load is increased, pressure loss of the intake air produced when passing through the electric compressor 26a becomes greater (in other words, the outlet pressure of the electric compressor 26a becomes lower). It should be noted that the electric power which is stored in the battery 30 also includes the above described regenerative electric power.

The electric supercharger 26 does not use the exhaust gas of the internal combustion engine 10 as its power source, contrary to a turbo-supercharger. Also, the internal combustion engine 10 does not include any other superchargers other than the electric supercharger 26. A surge tank 24 is arranged in a portion of the intake air passage 16 located on the downstream side of the electric compressor 26a. The surge tank 34 corresponds to a collective portion of an intake manifold of the intake air passage 16. An intercooler 36 for cooling the intake air compressed by the electric compressor 26a is arranged at the surge tank 34. Moreover, an intake air pressure sensor 38 that outputs a signal responsive to surge tank pressure (i.e., intake manifold pressure) Pb is attached to the surge tank 34. Furthermore, an upstream-side catalyst 40 and a downstream-side catalyst 42 are arranged in the exhaust gas passage 18 in order to purify the exhaust gas.

The internal combustion engine 10 is further provided with a low pressure loop (LPL) type EGR device 50. The EGR device 50 is equipped with an EGR passage 52 and an EGR valve 54. The EGR passage 52 connects the exhaust gas passage 18 (more specifically, its portion between the upstream-side catalyst 40 and the downstream-side catalyst 42) with the intake air passage 16. An EGR introduction port 56 that is a connection port of the EGR passage 52 with respect to the intake air passage 16 is formed at a portion between the throttle valve 24 and the electric compressor 26a. That is to say, the EGR introduction port 56 is formed at a portion of the intake air passage 16 located on the upstream side of the electric compressor 26a. Also, the throttle valve 24 is formed at a portion of the intake air passage 16 located on the upstream side of this EGR introduction port 56. The EGR valve 54 adjusts the amount of EGR gas introduced in the intake air passage 16 through the EGR passage 52.

The system according to the present embodiment is provided with a control device 60 for controlling the internal combustion engine 10. The control device 60 is an electronic control unit (ECU) that includes at least one processor, at least one memory, and an input/output interface. The input/output interface receives sensor signals from various sensors mounted on the internal combustion engine 10, and also outputs actuating signals to various actuators for controlling the operation of the internal combustion engine 10. The various sensors described above include a crank angle sensor 62, an accelerator position sensor 64 and an outside air temperature sensor 66 in addition to the air flow sensor 22, the compressor rotational speed sensor 32 and the intake air pressure sensor 38. The crank angle sensor 62 outputs a signal responsive to the crank angle. The control device 60 can calculate an engine speed NE by the use of the signal of the crank angle sensor 62. The accelerator position sensor 64 outputs a signal responsive to the depression amount (i.e., accelerator position) of an accelerator pedal of the vehicle on which the internal combustion engine 10 is mounted. The outside air temperature sensor 66 outputs a signal responsive to the outside air temperature. Furthermore, the various actuators described above include fuel injection valves 68 and an ignition device 70 in addition to the throttle valve 24, the electric supercharger 26 (MG 26b) and the EGR valve 54.

In the memory of the control device 60, various programs and various data (including maps) for controlling the internal combustion engine 10 are stored. The processor executes the programs stored in the memory. As a result, various functions of the control device 60 are achieved. For example, the following control (including regenerative power generation) of the intake air flow rate (i.e., intake air pressure) by the operation of the throttle valve 24 and the electric supercharger 26 is one of the functions achieved as a result of the program being executed. It should be noted that the control device 60 may alternatively be configured with a plurality of ECUs.

1-2. Arrangement of Components of Intake System

The internal combustion engine 10 according to the present embodiment has a feature on arrangement locations of the individual components of the intake system (i.e., EGR introduction port 56, electric compressor 26a and throttle valve 24). In detail, the EGR introduction port 56, the electric compressor 26a and the throttle valve 24 are arranged at an "intake side" defined as follows.

FIG. 1 corresponds to a view of the internal combustion engine 10 from the axial line direction of each cylinder 12. In the engine main body (cylinder head) 14, intake ports 72 are formed. The intake ports 72 have inner passages that communicate with the respective cylinders 12 and function as a part of the intake air passage 16. Similarly, exhaust ports 74 are formed in the engine main body 14. The side of each intake port 72 in the view from the axial line direction of each cylinder 12 corresponds to the "intake side" of each cylinder 12 mentioned here. Also, the other side opposite to the "intake air side" with respect to the center of each cylinder 12 corresponds to an "exhaust side" which is paired with the "intake side". In more detail, in the view from the axial line direction of each cylinder 12, the "intake side" and the "exhaust side" are located along a direction perpendicular to a straight A parallel to the row direction of the three cylinders 12 aligned in a row as shown in FIG. 1.

Furthermore, according to the internal combustion engine 10, the EGR valve 54 in the EGR passage 52 is also arranged at the "intake side" as shown in FIG. 1.

1-3. Control of Throttle Valve and Electric Supercharger

In the following explanation, an "intake air pressure P2" corresponds to an inlet pressure of the electric compressor 26a (in more detail, an intake air passage pressure in a portion between the throttle valve 24 and the electric compressor 26a). An "intake air pressure P3" corresponds to an outlet pressure of the electric compressor 26a (=surge tank pressure Pb).

The control of the throttle valve 24 and the electric supercharger 26 according to the present embodiment mainly corresponds to the control of the intake air pressure P2 required to satisfy the following various requests in the individual engine load regions (≈individual in-cylinder-charge-air-amount regions) while satisfying a torque request from the driver. In detail, the intake air pressure P3 is correlated with the in-cylinder charge air amount (i.e., engine torque). Firstly, the intake air pressure control according to the present embodiment is executed while satisfying that the intake air pressure P3 is consistent with a torque request (i.e., while satisfying the torque request). Thus, it can be said that this intake air pressure control includes an adjustment of the intake air flow rate Ga for satisfying the torque request.

1-3-1. Outline of Control of Throttle Valve and Electric Supercharger

FIG. 2 is a graph for describing requests that are given priority in the respective engine operating regions. The engine operating regions shown in FIG. 2 are defined by engine load and engine speed NE. In this way, FIG. 2 indicates relationships between the engine operating regions defined two-dimensionally not only using the engine load but also using the engine load and engine speed NE, and various requests. The various requests mentioned here include a "response improvement request", a "regenerative power generation request", an "EGR request" and a "purging-and-PCV request".

The "response improvement request" refers to a request for improving the supercharging response when transitioning from a "non-supercharging region" to a "supercharging region". The non-supercharging region corresponds to an operating region in which the intake air pressure P3 is lower than or equal to the atmospheric air pressure. The supercharging region corresponds to an operating region in which the intake air pressure P3 is higher than the atmospheric air pressure. The "regenerative power generation request" refers to a request for executing the regenerative power generation using the electric supercharger 26. The "EGR request" refers to a request for introduction of the EGR gas using the EGR device 50. The "purging-and-PCV request" refer to a request concerning purging of fuel vapor that is adsorbed on a canister and a request for introduction of blow-by gas for ventilation of a crank chamber. In addition, it is supposed that the purge gas and the blow-by gas are introduced into a portion of the intake air passage 16 between the throttle valve 24 and the electric compressor 26a.

For ease of explanation, the engine load regions are herein separately referred to as a low load region and a medium load region that are included in the non-supercharging region, and a high load region corresponding to the supercharging region. As shown in FIG. 2, in the low load region, the response improvement request is given priority. In the medium load region, the regenerative power generation request is given priority. In the high load region, the EGR request and the purging-and-PCV request are given priority. In more detail, in an engine operating region located on a high-load and low-speed side, the EGR request is given priority, and, in an engine operating region located on a high-load and high-speed side, the purging-and-PCV request is given priority.

Figure 4:
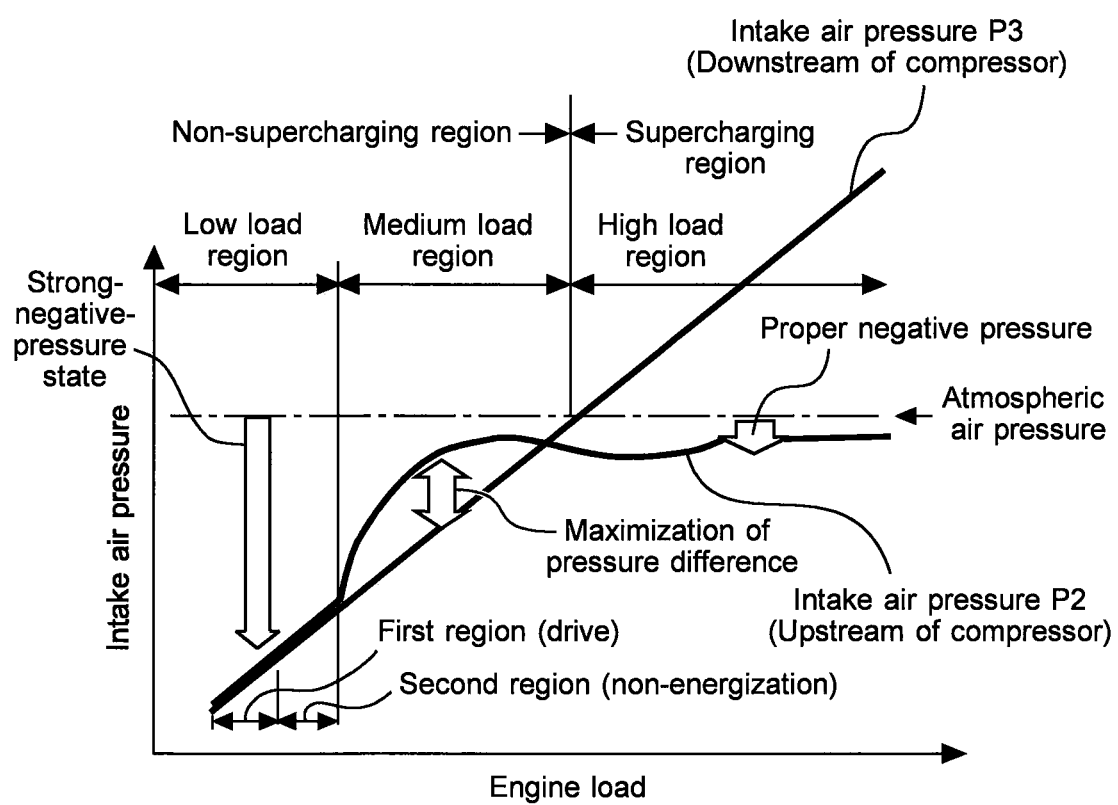
FIG. 4 is a graph that illustrates a relationship between pressures (i.e., intake air pressures P2 and P3) and engine load.

FIG. 3 is a table that collectively indicates the control policy of the intake air pressure in the individual engine load regions. FIG. 4 is a graph that illustrates a relationship between the pressures (i.e., intake air pressures P2 and P3) and the engine load.

1-3-1-1. Low Load Region (Response Improvement Request is Given Priority)

As shown in FIG. 3, an object of the control of the intake air pressure P2 for the low load region in which the response improvement request is given priority is to increase the compressor rotational speed NC in order to improve the supercharging response. This kind of increase of the compressor rotational speed NC is performed by the use of an intake air flow rate adjustment function by the throttle valve 24.

That is to say, according to the low load region included in the non-supercharging region, the throttle valve 24 arranged upstream of the electric compressor 26a is utilized to adjust the intake air flow rate Ga. In detail, in order to achieve the intake air pressure P3 that satisfies the intake air flow rate Ga that is necessary to achieve a required engine load (i.e., engine torque), the opening degree of the throttle valve 24 is reduced. As a result, the intake air pressure P2 decreases (i.e., a strong negative pressure state is achieved), and, with this, the intake air pressure P3 also decreases. This means that the volumetric flow rate of the intake air that passes through the electric compressor 26a under a constant mass flow rate increases. Since the compressor rational speed NC is proportional to the volumetric flow rate, the compressor rotational speed NC increases as a result of increases of the intake air pressures P2 and P3. It should be noted that advantageous effects of improvement of the supercharging response associated with an increase of the compressor rotational speed NC will be described later with reference to FIG. 12.

The opening degree adjustment of the throttle valve 24 in the low load region is performed in consideration of the control state of the electric supercharger 26. In detail, according to the present embodiment, in a "first region" that is an engine load region located on the low load side in the low load region, the electric supercharger 26 is in a drive state (i.e., energization state). In this drive state, the energization of the MG 26b is performed such that a driving force required to cause a pressure ratio (=P3/P2) of the electric compressor 26a to approach 1 is applied to the electric compressor 26a. As a result of the electric compressor 26a being driven in this way when the intake air flow rate Ga is small (that is, when the kinetic energy of the intake gas that rotates the electric compressor 26a is low), the supercharging is not performed and the pressure loss of the intake air is prevented from being produced due to the intake air passing through the electric compressor 26a. In the first region, under the precondition that the electric compressor 26a is driven in this way, the opening degree of the throttle valve 24 is adjusted such that the intake air flow rate Ga (i.e., intake air pressure P3) that satisfies a torque request is achieved. It should be noted that the intake air pressure control by the operation of the throttle valve 24 and the electric supercharger 26 in the first region as described above also corresponds to an example of the "first air flow rate adjustment processing" according to the present disclosure.

Furthermore, in a "second region" that is an engine load region located on the high load side in the low load region, the electric supercharger 26 is put in a non-energization state. As a result, the electric compressor 26a is driven to rotate by the use of the kinetic energy of the intake air that is higher than that during use of the first region. Thus, the pressure ratio roughly becomes about 1, although it strictly becomes lower than 1. In the second region, under the precondition that the electric compressor 26a is not energized in this way (that is, under the precondition that it naturally rotates with the compressor rotational speed NC), the opening degree of the throttle valve 24 is adjusted such that the intake air flow rate Ga (i.e., intake air pressure P3) that satisfies the torque request is achieved. It should be noted that the intake air pressure control by the operation of the throttle valve 24 and the electric supercharger 26 in the second region as described above also corresponds to an example of the "second air flow rate adjustment processing" according to the present disclosure.

1-3-1-2. Medium Load Region (Regenerative Power Generation Region)

As shown in FIG. 3, an object of the control of the intake air pressure P2 for the medium load range in which the regenerative power generation request is given priority is to maximize the amount of the regenerative power generation. As shown in FIG. 4, this medium load region (that is, regenerative power generation region) is located on the high load side relative to the second region included in the low load region described above. In the medium load region, the regenerative power generation using the electric compressor 26a is performed. In this way, the non-supercharging region according to the present embodiment is consist of the first region, the second region and the regenerative power generation region in the order from the low load side.

In order to maximize the amount of the regenerative power generation, it is favorable that a pressure difference before and after the electric compressor 26a is maximized by opening the throttle valve 24 as much as possible and maximizing the power generation load applied to the MG 26b (in other words, the pressure ratio is minimized within a range lower than 1), provided that the torque request is satisfied. Accordingly, in the medium load region, the power generation load is adjusted while the throttle valve 24 is basically controlled to be fully open, whereby the intake air flow rate Ga (i.e., intake air pressure P3) is controlled so as to have a value that satisfies the torque request.

To be more specific, where the throttle valve 24 is controlled so as to be fully open in the regenerative power generation region, in order to perform the regenerative power generation while satisfying the intake air pressure P3 (i.e., intake air flow rate Ga) according to the torque request, the power generation load is made lower when the engine load is higher. Furthermore, the low load side in the regenerative power generation region may include an engine load region in which the intake air pressure P3 cannot be decreased to a value that satisfies the torque request even if the power generation load is applied with the maximum value within a predetermined control range while fully opening the throttle valve 24. If this kind of engine load region is included in the regenerative power generation region, in order to satisfy the intake air pressure P3 according to the torque request, the throttle valve 24 and the electric supercharger 26 may alternatively be controlled such that the opening degree of the throttle valve 24 is made smaller when a required engine load (i.e., required engine torque) is lower while the power generation load is applied with the maximum value described above.

1-3-1-3. High Load Region (Supercharging Region)

As shown in FIG. 3, an object of the control of the intake air pressure P2 for the high load region is to secure an EGR gas flow rate, or a purge gas flow rate and a blow-by gas flow rate. Specifically, in order to achieve this kind of object, the intake air pressure P2 is put in a proper weak-negative-pressure state by slightly decreasing the opening degree of the throttle valve 24 while driving the electric compressor 26a to perform the supercharging. In more detail, the opening degree of the throttle valve 24 is adjusted and the compressor rotational speed NC is also adjusted such that the intake air pressure P3 (i.e., intake air flow rate Ga) that satisfies the torque request is achieved while satisfying the weak-negative-pressure state. In addition, as shown in FIG. 4, in the high load region, the pressure ratio becomes higher than 1.

Figure 5:
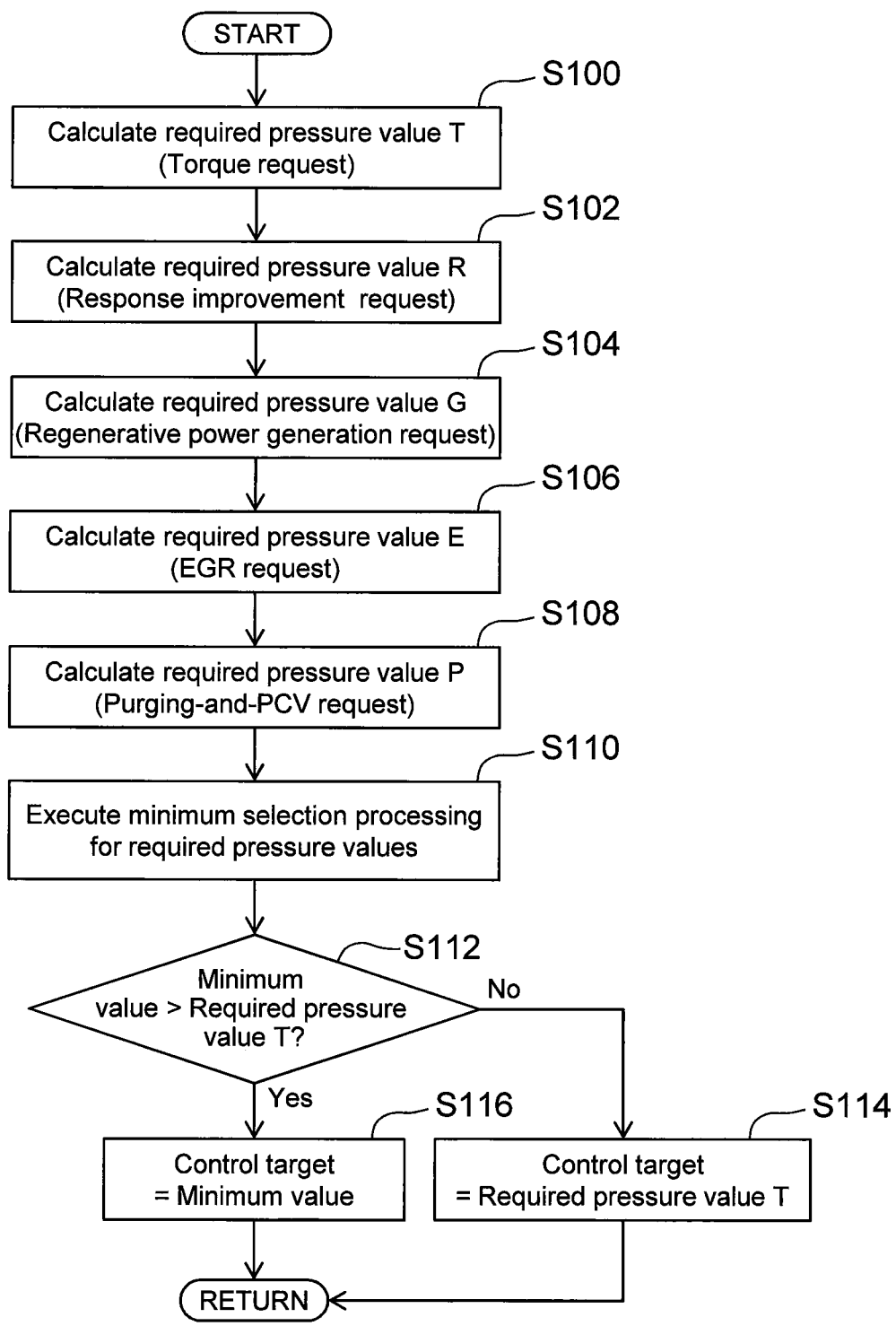
FIG. 5 is a flow chart that illustrates a routine of the processing concerning a control of a throttle valve and an electric supercharger according to the first embodiment of the present disclosure.

1-3-2. Processing of Control Device Concerning Control of Throttle Valve and Electric Supercharger FIG. 5 is a flow chart that illustrates a routine of the processing concerning the control of the throttle valve 24 and the electric supercharger 26 according to the first embodiment of the present disclosure. The control device 60 repeatedly executes the processing of the present routine at a predetermined control interval.

Figure 6:
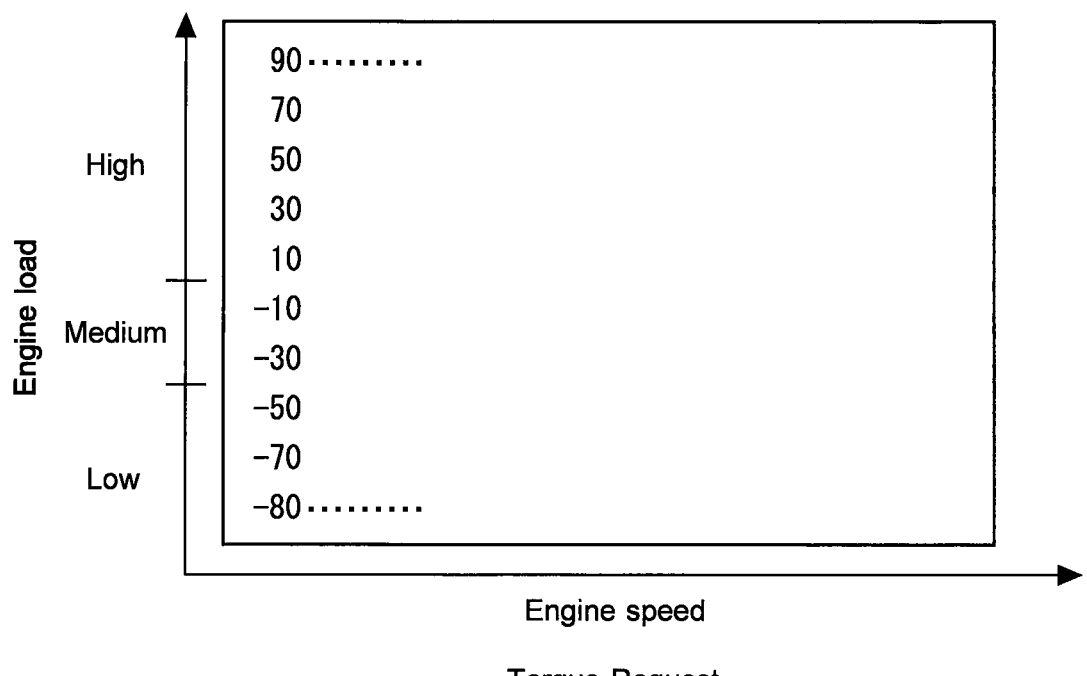
FIG. 6 is a graph that illustrates an example of a map of a required pressure value T.

According to the routine shown in FIG. 5, firstly, the control device 60 calculates a required pressure value T associated with the torque request (step S100). This required pressure value T corresponds to a value of the intake air pressure P3 (=surge tank pressure Pb) at the downstream side of the electric compressor 26a. FIG. 6 is a graph that illustrates an example of a map of the required pressure value T. The map shown in FIG. 6 defines the required pressure values T depending on the engine operating regions (i.e., depending on the engine load and the engine speed NE). The engine load in the vertical axis corresponds to a required engine load (i.e., required engine torque) depending on the accelerator position, and this also applies to FIGS. 7 to 10 described later.

Each map value shown in FIG. 6 is used when depression of the accelerator pedal by the driver is detected (that is, at the time of acceleration request). Each map value (Unit: kPa) is set to be greater when the engine load is higher, and, in the example shown in FIG. 6, map values with respect to the same engine load are equal to each other without depending on the engine speed NE. On the other hand, the following invalid values (not shown) are used as the required pressure values T used at the time of non-acceleration request. That is to say, the invalid values are set such that, in the individual engine operating regions, the required pressure values T become lower than any of required pressure values in FIGS. 7 to 10 described later.

Figure 7:
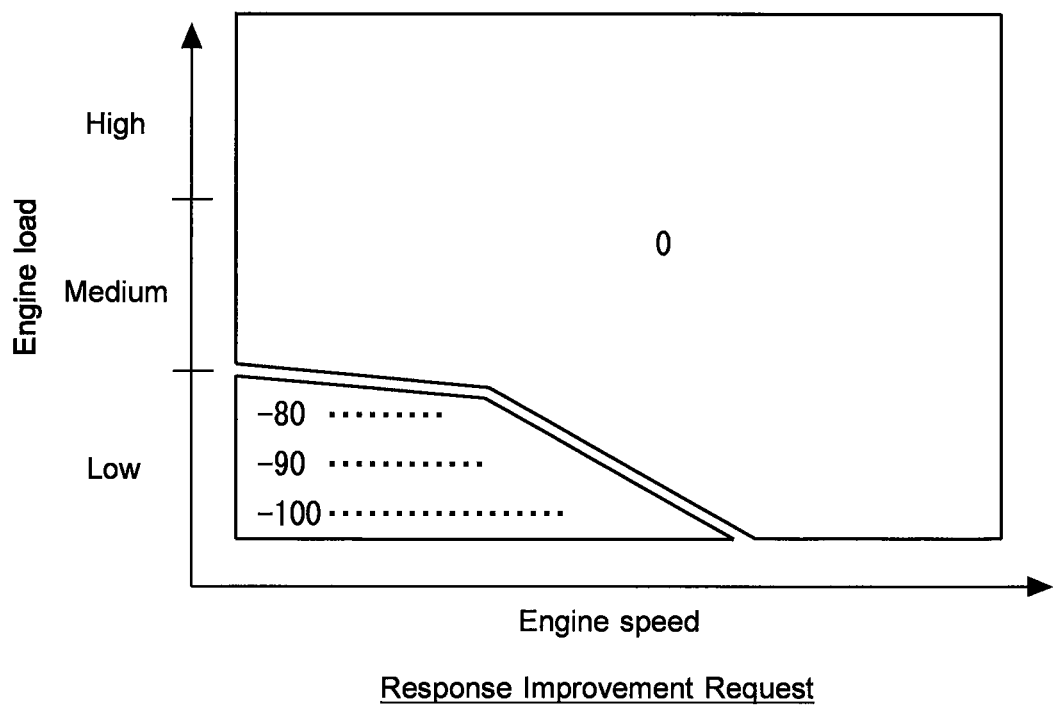
FIG. 7 is a graph that illustrates an example of a map of a required pressure value R.

Next, the control device 60 calculates a required pressure value R associated with the response improvement request (step S102). This required pressure value R corresponds to a value of the intake air pressure P2 at the upstream side of the electric compressor 26a, and this also applies to FIGS. 8 to 10 described later. FIG. 7 is a graph that illustrates an example of a map of the required pressure value R. According to the map shown in FIG. 7, in a region which is located on the low-load and low-speed side and in which a high response improvement request is present, values to obtain the strong negative pressure state (for example, −100 to −80 kPa) are set as the requires pressure value R. Under the same engine load in this region, the required pressure values R are set to be smaller (i.e., to be greater on the negative side) than any of required pressure values G, E and P described later. This region includes a low load region in which the response improvement request is given priority in FIG. 2. On the other hand, the required pressure values R in a region other than this region are made zero (i.e., atmospheric air pressure) as an example.

Figure 8:
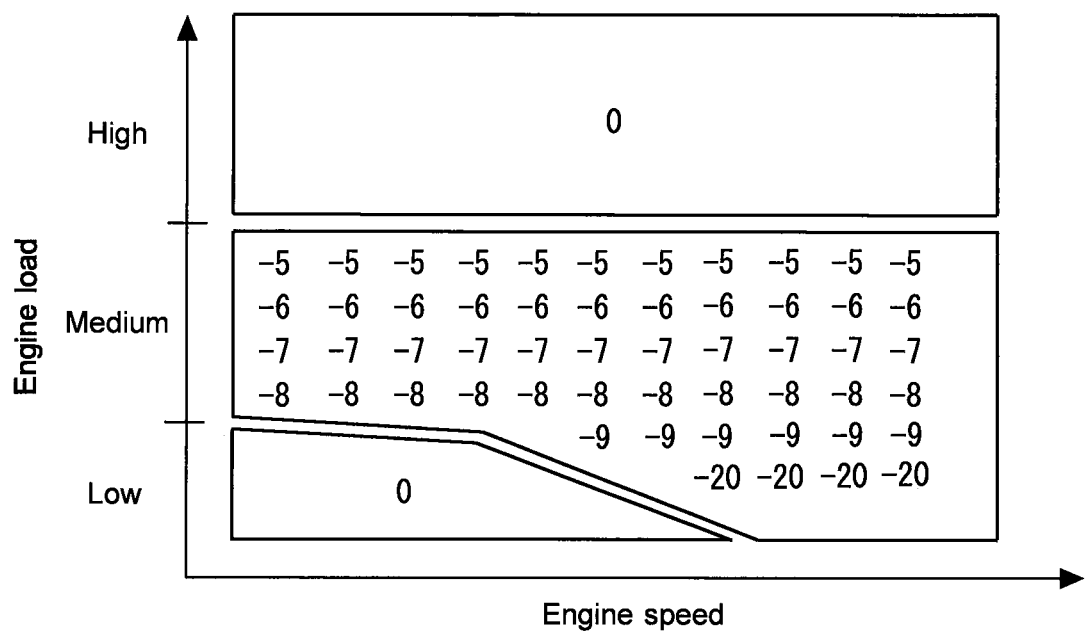
FIG. 8 is a graph that illustrates an example of a map of a required pressure value G.

Next, the control device 60 calculates a required pressure value G associated with the regenerative power generation request (step S104). FIG. 8 is a graph that illustrates an example of a map of the required pressure value G. According to the map shown in FIG. 8, the required pressure values G are set to negative values in the whole medium load region (including the high engine speed side) that is equal in engine load level to the medium load region in which the regenerative power generation request is given priority in FIG. 2, and also set to negative values in a region at the low-load and high-speed side. In more detail, the required pressure values G used in these regions are set such that, as an example, the negative pressure becomes lower when the engine load is higher. The required pressure values R are set so as to be smaller than any of the other required pressure values R, E and P under the same engine load in this region. On the other hand, the required pressure values R in regions other than the regions in which the negative values are set in this way are made zero, as an example.

Figure 9:
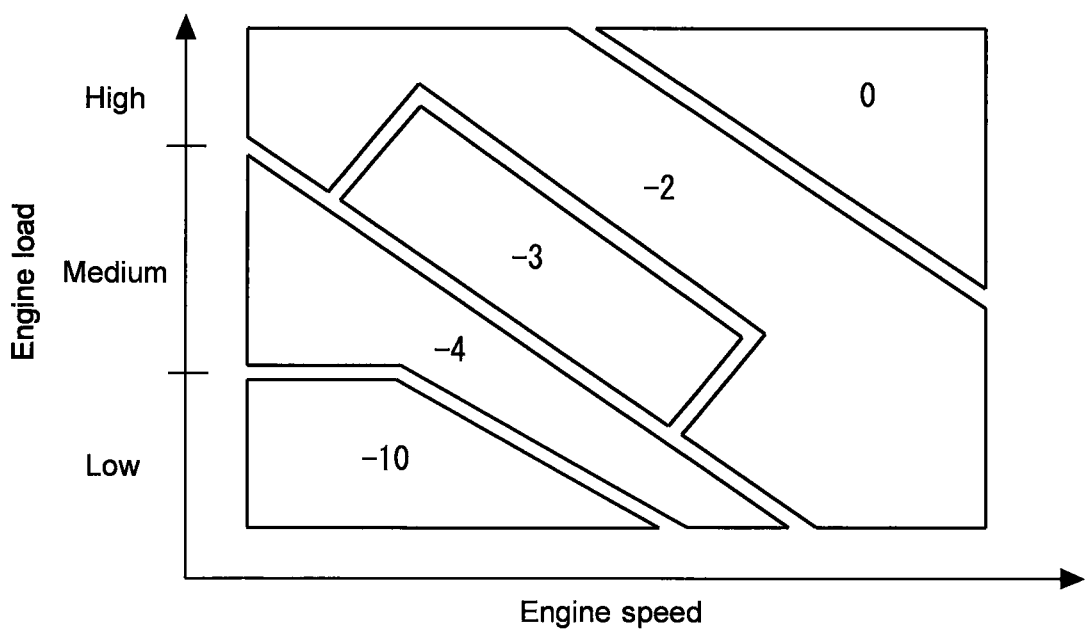
FIG. 9 is a graph that illustrates an example of a map of a required pressure value E.

Next, the control device 60 calculates a required pressure value E associated with the EGR request (step S106). FIG. 9 is a graph that illustrates an example of a map of the required pressure value E. According to the map shown in FIG. 9, the required pressure values E are roughly set to be smaller (i.e., greater on the negative value) when the engine load is lower and the engine speed NE is lower. Moreover, the required pressure values E in a high-load and high-speed region in which introduction of the EGR gas is not required are made zero. The required pressure values E are set to be lower than any of other required pressure values R, G and P under the same engine load in a high-load and low-speed region in which the EGR request is given priority in FIG. 2. It should be noted that, in the regions in which the required pressure values E are not zero, the EGR valve 54 is opened with a predetermined opening degree.

Figure 10:
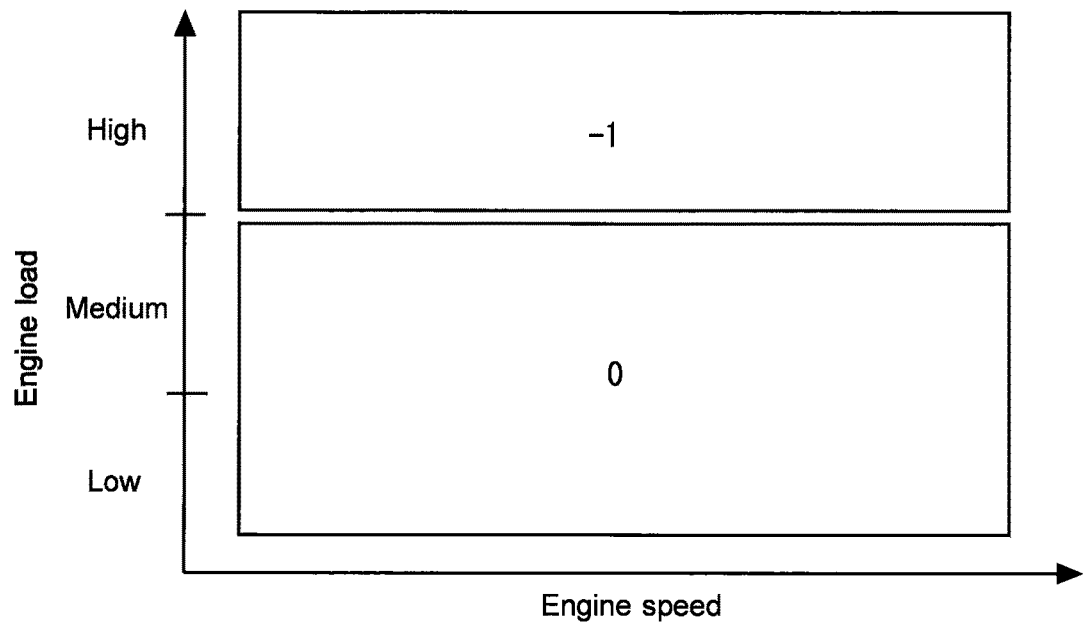
FIG. 10 is a graph that illustrates an example of a map of a required pressure value P.

Next, the control device 60 calculates the required pressure values P associated with the purging-and-PCV request (step S108). FIG. 10 is a graph that illustrates an example of a map of the required pressure value P. According to the map shown in FIG. 10, the required pressure values P are set to be −1 in the entire high-load region (including the high-speed side) that is equal in engine load level to the high load region in FIG. 2. In addition, the required pressure values P in a region other than the high load region described above are made zero. The required pressure values P are set to be lower than any of other required pressure values R, G and E under the same engine load in a high-load and high-speed region in which the purging-and-PCV request is given priority in FIG. 2.

Next, the control device 60 executes a minimum selection processing for selecting a minimum value among the required pressure values R, G, E and P that are calculated from the respective maps shown in FIGS. 7 to 10 associated with the current engine load and engine speed NE (step S110). According to the minimum selection processing that uses the setting of the maps shown in FIGS. 7 to 10 in this way, engine operating regions in which the various requests are given priority in a manner as shown in FIG. 2 are obtained. It should be noted that, in FIGS. 7 to 10, the respective map values are also set in a region located on the low-and-medium-load and high-speed side which is not represented in FIG. 2. However, this region corresponds to a region that is not actually supposed to be used during the operation of the internal combustion engine 10.

Next, the control device 60 determines whether or not the minimum value that is selected in step S110 is greater than the required pressure value T (associated with the torque request) (step S112). As a result, if the determination result of step S112 is negative (minimum value≤required pressure value T), the control device 60 proceeds to step S114. In step S114, the control device 60 sets the required pressure value T as a control target value of the intake air pressure (intake air pressure P3).

To be more specific, at the time of acceleration request, the required pressure value T is calculated from the map shown in FIG. 6. As a result, when the engine operating region required at the time of the acceleration request corresponds to a region other than a region in which the required pressure value G (associated with the regenerative power generation request) is selected as the minimum value, that is, when the engine operating region required at the time of the acceleration request corresponds to the high load region (in which the EGR request, or the purging-and-PCV request is given priority) or the low load region (in which the response improvement request is given priority) other than the medium load region (in which the regenerative power generation request is given priority) in FIG. 2, the required pressure values T becomes greater than the minimum value. A situation that the high load region is requested in FIG. 2 as a result of the acceleration request being made during use of the low load region or the medium load region in FIG. 2 corresponds to a situation that a high acceleration request is requested. In this kind of situation, the processing proceeds to step S114, and, as described above, the required pressure value T is set as the control target value of the intake air pressure (intake air pressure P3). As a result, since the torque request is given priority over the other various requests, it is guaranteed to favorably satisfy the torque request in the situation described above. In more detail, for example, by driving the electric compressor 26a in order to satisfy the torque request in the minimum time, a high acceleration performance is achieved.

If, on the other hand, the determination result of step S112 is positive (minimum value>required pressure value T), the control device 60 proceeds to step S116. In step S116, the control device 60 sets the minimum value as the control target value of the intake air pressure (intake air pressure P2). As a result, the throttle valve 24 and the electric supercharger 26 are controlled such that a request associated with the selected minimum value is satisfied. Specifically, the throttle valve 24 and electric supercharger 26 are controlled in the manner described above with reference to FIGS. 2 to 4. It should be noted that, according to the example of the processing of this routine, as to the medium load region (in which the regenerative power generation region is given priority), the regenerative power generation is performed without depending on the determination result of step S112.

1-3-3. Control of Throttle Valve and Electric Supercharger Performed when Transitioning from Low Load Region to Medium Load Region FIG. 11 is a time chart that illustrates an example of the operation of a fresh air increment processing and a regenerative power generation start processing that are performed by the control device 60 when transitioning from the low load region to the medium load region shown in FIG. 2.

Figure 11:
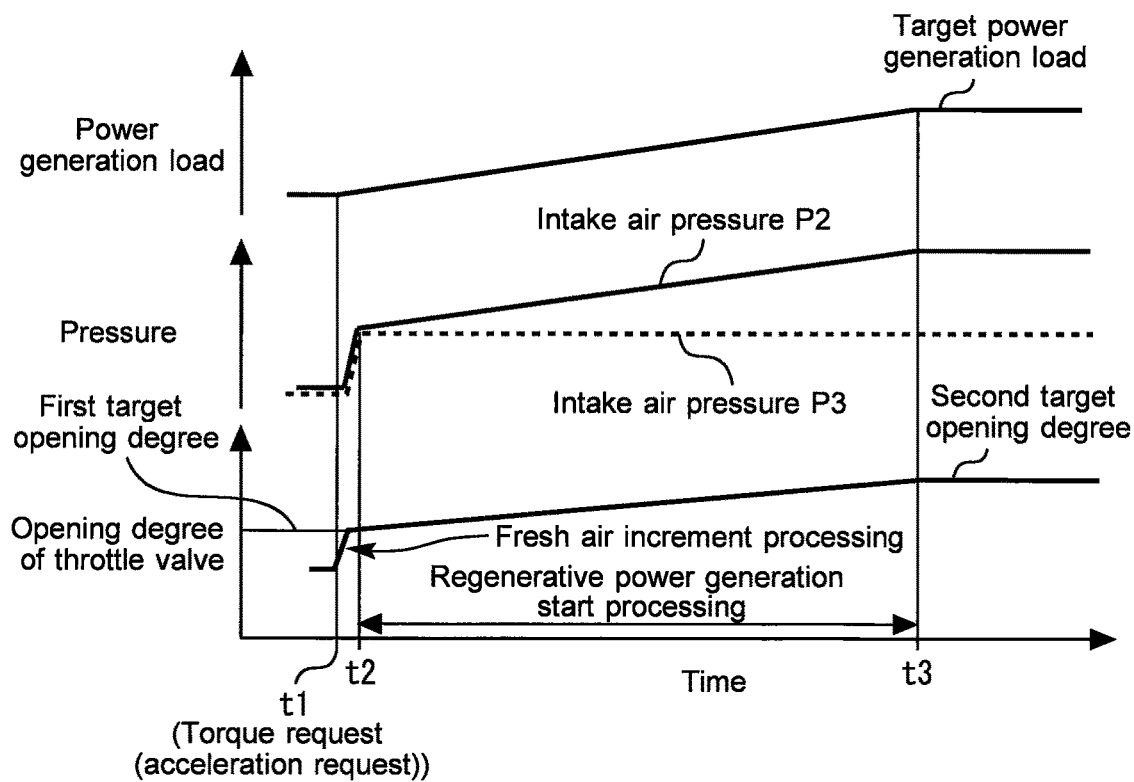
FIG. 11 is a time chart that illustrates an example of operation of a fresh air increment processing and a regenerative power generation start processing that are performed by a control device when transitioning from a low load region to a medium load region shown in FIG. 2.

A time point t1 in FIG. 11 corresponds to a time point at which a torque request (i.e., acceleration request) that requests to transition from the low load region (first region or second region) to the medium load region (i.e., regenerative power generation region) shown in FIG. 2 is made. In response to the arrival of the time point t1, the control device 60 executes the "fresh air increment processing".

As shown in FIG. 11, the fresh air increment processing corresponds to processing to open the throttle valve 24 toward a "first target opening degree" before applying a power generation load to the electric supercharger 26. The first target opening degree corresponds to an opening degree of the throttle valve 24 required to obtain a required in-cylinder charge air amount required to achieve a required engine torque in the regenerative power generation region. The required in-cylinder charge air amount can be calculated from, for example, a map (not shown) that defines a relationship between the required engine torque and the required in-cylinder charge air amount. In addition, the first target opening degree can be calculated from, for example, a map (not shown) that defines a relationship between the required in-cylinder charge air amount and the first target opening degree.

The opening degree of the throttle valve 24 is made greater by the fresh air increment processing, whereby the intake air pressure P2 and the intake air pressure P3 (i.e., inlet pressure and outlet pressure of the electric compressor 26a) increase as shown in FIG. 11. A time point t2 corresponds to a time point at which the intake air pressure P3 has increased to a value according to the required in-cylinder charge air amount described above.

Figure 12:
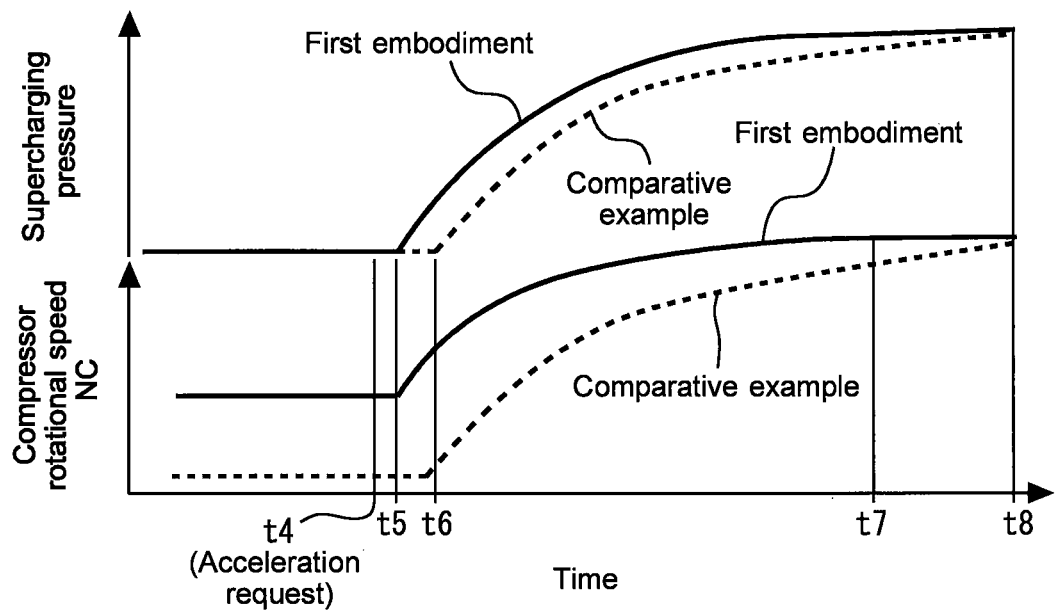
FIG. 12 is a time chart for describing advantageous effects on improvement of a supercharging response in transitioning from a non-supercharging region to a supercharging region.

When the time point t2 is reached, the "regenerative power generation start processing" is started. According to the regenerative power generation start processing, as shown in FIG. 12, the throttle valve 24 is gradually opened toward a "second target opening degree" greater than the first target opening degree and the power regeneration load of the electric supercharger 26 is gradually increased toward a "target power regeneration load", while satisfying (i.e., maintaining) the required in-cylinder charge air amount described above. The second target opening degree and the target power regeneration load correspond to values that maximize the pressure difference before and after the electric compressor 26a (=P2-P3) while satisfying the required in-cylinder charge air amount. In response to the opening degree of the throttle valve 24 and the power regeneration load gradually increasing, the amount of the regenerative power generation gradually increases.

The values of the second target opening degree and target power regeneration load as described above are determined in advance as values depending on, for example, the engine load and the engine speed NE. Also, since the torque request of the driver is already satisfied by the fresh air increment processing, adjustments of the opening degree of the throttle valve 24 and the power regeneration load toward the second target opening degree and the target power regeneration load, respectively, are performed over a predetermined time period (for example, time period (t2-t3) shown in FIG. 11). It should be noted that these second target opening degree and the target power regeneration load respectively correspond to target values of the opening degree of the throttle valve 24 and the power generation load of the electric supercharger 26 in the regenerative power generation region shown in FIG. 2.

To be more specific, maintaining the intake air pressure P3 equal to the surge tank pressure Pb around the value at the time point t2 as shown in FIG. 11 corresponds to maintaining the required in-cylinder charge air amount. According to the regenerative power generation start processing, the intake air pressure P2 is gradually increased by gradually increasing the power regeneration load while gradually increasing the opening degree of the throttle valve 24 toward the second target opening degree. On the other hand, since the required in-cylinder charge air amount is maintained, the intake air pressure P3 becomes constant.

A time point t3 corresponds to a time point at which the opening degree of the throttle valve 24 is reached to the second target opening degree and the power regeneration load of the electric supercharger 26 is reached to the target power regeneration load. As a result of arrival of the time point 3, the pressure difference before and after the electric compressor 26a can be maximized while satisfying the required in-cylinder charge air amount. In a steady state at or after the time point t3 (i.e., when the individual time change rates of the engine load and engine speed NE are lower than the respective predetermined values), the regenerative power generation can be performed under the maximized pressure difference before and after the electric compressor 26a.

In addition, according to the regenerative power generation start processing described so far, the intake air flow rate Ga is adjusted such that the required in-cylinder charge air amount depending on the torque request is satisfied (i.e., maintained) by adjustment of the opening degree of the throttle valve 24 and adjustment of the power regeneration load of the electric supercharger 26 (more specifically, power regeneration load torque).

1-4. Advantageous Effects on Configuration of Internal Combustion Engine and on Control of Throttle Valve and Electric Supercharger As described so far, the throttle valve 24, the EGR introduction port 56 and the electric compressor 26a are arranged in the intake air passage 16 of the internal combustion engine 10 according to the present embodiment in order from the upstream side thereof. According to this kind of configuration, by making the opening degree of the throttle valve 24 smaller than the fully open degree in the supercharging region, negative pressure can be generated on the upstream side of the electric compressor 26a in which the EGR introduction port 56 is arranged. As a result, the effects of increase of EGR gas flow rate by increasing the pressure difference between the end portion of the EGR passage 52 located on the exhaust gas passage 18 side and the end portion (i.e., EGR introduction port 56) of the EGR passage 52 located on the intake air passage 16 side can be achieved. Therefore, a supercharged engine that can introduce a high concentration of EGR gas in the supercharging region can be achieved. On that basis, according to the configuration and control of the internal combustion engine 10 of the present embodiment, the following advantageous effects can be achieved.

1-4-1. Cost Reduction and Improvement of Supercharging Response in Transitioning to Supercharging Region Any other throttle valves other than the throttle valve 24 are not arranged in the intake air passage 16 of the internal combustion engine 10. In addition, in the low-load region included in the non-supercharging region, the control device 60 controls the throttle valve 24 to adjust the intake air flow rate Ga to a value required according to the torque request while driving the electric supercharger 26 or not energizing the electric supercharger 26 as shown in FIG. 3.

As described above, in the internal combustion engine 10, one throttle valve 24 has both of the function of generating the negative pressure for EGR introduction and the function of adjusting the intake air flow rate (i.e., fresh air flow rate). Because of this, cost can be reduced as compared to an example of an internal combustion engine that includes a plurality of throttle valves in order to respectively achieve these functions. Also, the internal combustion engine 10 is configured such that the function of adjusting the fresh air flow rate is achieved by the throttle valve 24 arranged on the upstream of the electric compressor 26a. Therefore, the following advantageous effects on improvement of the supercharging response can also be achieved.

FIG. 12 is a time chart for describing the advantageous effects on the improvement of the supercharging response in transitioning from the non-supercharging region to the supercharging region. It should be noted that two waveforms represented by the solids line in FIG. 12 are associated with the operation according to the present embodiment. On the other hand, two waveforms represented by the broken lines are associated with operation of a comparative example (i.e., example in which a throttle valve for adjusting the fresh air flow rate is arranged downstream of an electric supercharger).

A time point t4 in FIG. 12 corresponds to a time point at which an acceleration request (i.e., torque request) that requires transition from the non-supercharging region (first region or second region) to the supercharging region is made. Moreover, a time point t5 corresponds to a time point at which the compressor rotational speed NC and the supercharging pressure (i.e., surge tank pressure Pb) start to increase in response to the acceleration request in the operation according to the present embodiment, and a time point t6 corresponds to a time point similar to the above in the operation according to the comparative example. Furthermore, a time point t7 corresponds to a time point at which the increase of the compressor rotational speed NC required to transition to the supercharging region has been completed in the operation according to the present embodiment, and a time point t8 corresponds to a time point similar to the above in the comparative example. It should be noted that the "supercharging pressure" mentioned here is the same as the intake air pressure P3 in the present embodiment, and it corresponds to the downstream pressure of the throttle valve in the comparative example. In addition, although a waveform of the throttle valve 24 is not illustrated in FIG. 12, it is opened in response to the acceleration request at the time point t4.

As already described with reference to FIG. 3, if the throttle valve 24 is closed to adjust the fresh air flow rate in the non-supercharging region, the compressor rotational speed NC increases. Because of this, as shown in FIG. 12, the compressor rotational speed NC can be increased, prior to the time point t4 of the acceleration request, as compared to that in the comparative example. As a result, the amount of energy required for the electric compressor 26a to increase the compressor rotational speed NC to a value required to achieve the in-cylinder charge air amount depending on the torque request decreases. Therefore, as shown in FIG. 12, the time point t5 at which the compressor rotational speed NC (i.e., supercharging pressure) starts to rise becomes earlier than that at the time point t6 in the comparative example, and a time period (t5-t7) required to increase the compressor rotational speed NC also becomes shorter than the time period (t6-t8) required therefor in the comparative example. Consequently, the advantageous effects of improvement of the supercharging response can be achieved.

1-4-2. Advantageous Effects Related to Arrangement on Intake Side

Moreover, according to the internal combustion engine 10 of the present embodiment, the electric compressor 26a and the EGR introduction port 56 are arranged on the "intake side" (see FIG. 1) described above. Also, the electric supercharger 26 does not use the exhaust gas of the internal combustion engine 10 as its power source (that is, it is not an electrically assisted turbo-supercharger). Furthermore, the internal combustion engine 10 does not include any superchargers other than the electric supercharger 26. According to this kind of configuration, the following advantageous effects can be achieved.

Figure 13:
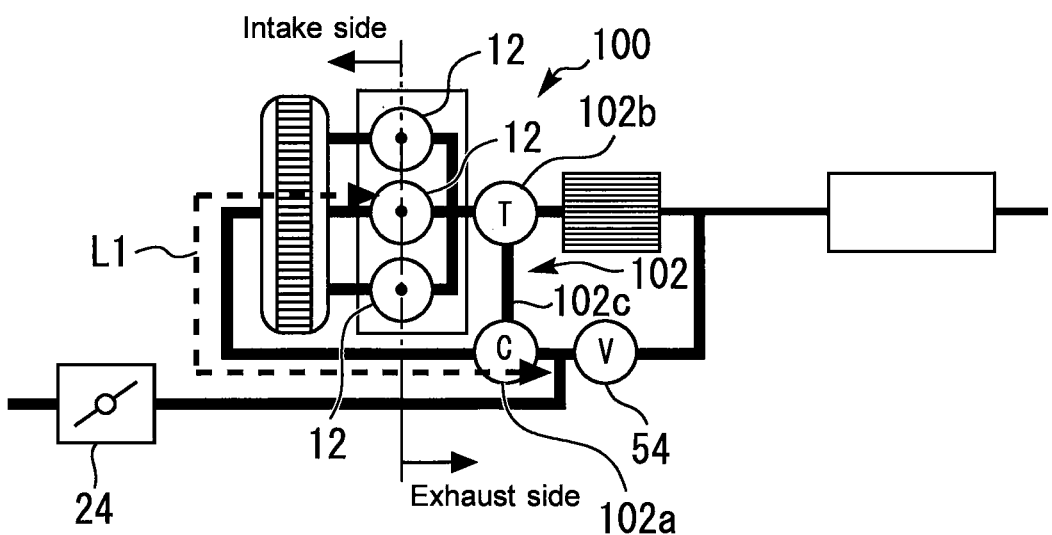
FIG. 13 is a schematic diagram for describing the configuration of an internal combustion engine (comparative example) referred to for comparison with the internal combustion engine shown in FIG. 1.

FIG. 13 is a schematic diagram for describing the configuration of an internal combustion engine 100 referred to for comparison with the internal combustion engine 10 shown in FIG. 1. The difference of the internal combustion engine 100 with respect to the internal combustion engine 10 will be described below. The internal combustion engine 100 is provided with a turbo-supercharger 102 instead of the electric supercharger 26. If a turbo-supercharger is included, a turbine is arranged at a portion of an exhaust gas passage located as upstream as possible in order to utilize a high exhaust gas energy. Because of this, according to the internal combustion engine 100 shown in FIG. 13, a turbine 102b is arranged on the "exhaust side" defined as described above. In accompaniment therewith, a compressor 104a connected to the turbine 102b through a connecting shaft 102c is also arranged on the exhaust side. As a result, a distance L1 from the cylinder 12 (combustion chamber) to the compressor 104a inevitably becomes longer than a distance from the cylinder 12 to the electric compressor 26a in the internal combustion engine 10 shown in FIG. 10, even if the distance L1 is tried to be as short as possible.

In other words, according to the internal combustion engine 10 having the configuration described above, its intake system can be made compact as compared to the internal combustion engine 100 having the turbo-supercharger 102. To be more specific, since the electric compressor 26a is arranged on the intake side, the responsiveness of the supercharging pressure improves due to the fact that the distance between the electric compressor 26a solely included and the cylinder 12 is short. In addition, since the EGR introduction port 56 is also arranged on the intake side, the responsiveness of the EGR ratio improves due to the fact that the distance between the EGR introduction port 56 and the cylinder 12 is short. Hereunder, with reference to FIG. 14, description will be further made with respect to improvement of the responsiveness of the EGR ratio. It should be noted that, since the EGR valve 54 is also arranged on the intake side as in the internal combustion engine 10, the responsiveness of the EGR ratio can be further improved.

Figure 14:
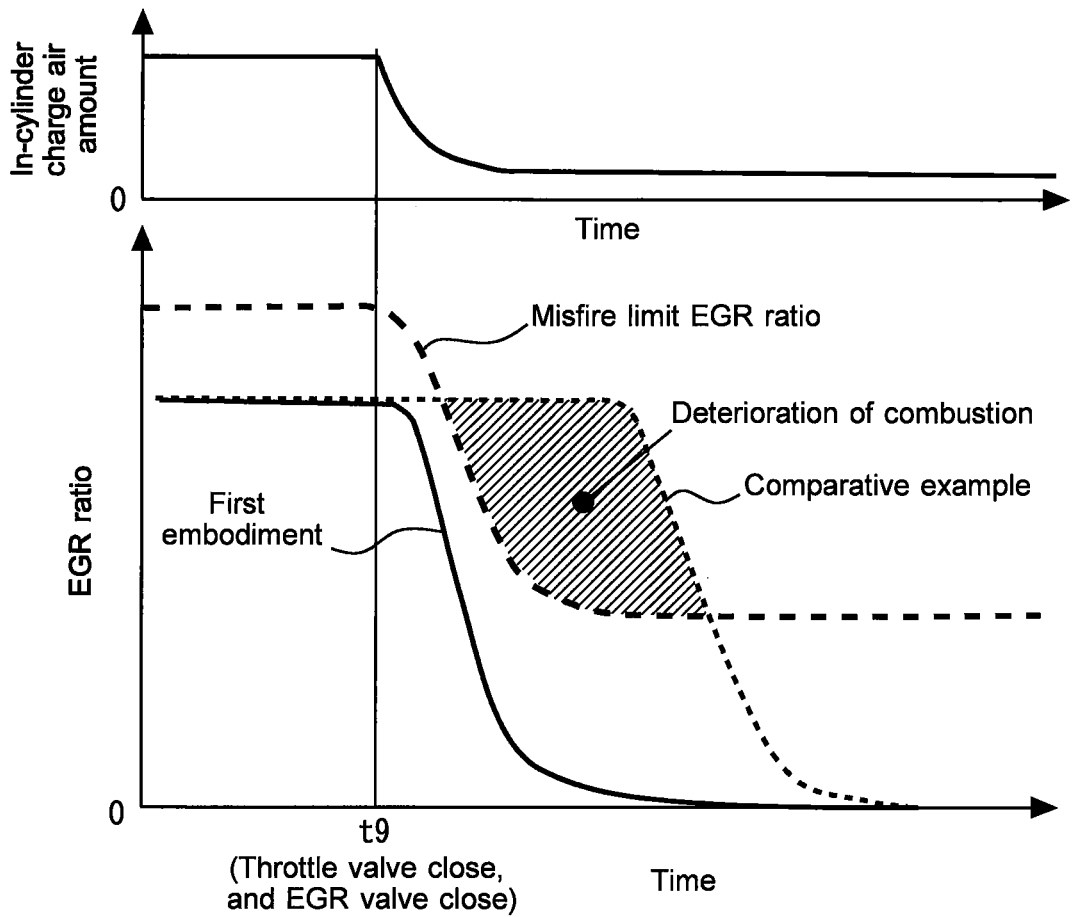
FIG. 14 is a time chart for describing effects of reducing a delay of decrease of an EGR ratio from an EGR introduction stop.

FIG. 14 is a time chart for describing the effects of reducing a delay of decrease of the EGR ratio from an EGR introduction stop. A comparative example in FIG. 14 corresponds to an example of operation of the internal combustion engine 100 shown in FIG. 13. A time point t9 corresponds to a time point of an EGR introduction stop as a result of the EGR valve 54 being closed. In addition, in the example shown in FIG. 14, the throttle valve 24 is also closed at the time point t9. Because of this, the in-cylinder charge air amount decreases after the time point t9 elapses as shown in FIG. 14. In response to this kind of decrease of the in-cylinder charge air amount, a misfire limit EGR ratio decreases.

As described above, according to the internal combustion engine 10 in which the EGR introduction port 56 as well as the electric compressor 26a is arranged on the intake side, the intake air passage volume through which a mixed gas of the fresh air and the EGR gas flows can be effectively reduced. A time period of the delay of decrease of the EGR ratio which is started from an EGR introduction stop (or a decrease of the amount of the EGR gas introduced) becomes longer in proportion to this intake air passage volume. According to the internal combustion engine 100 (comparative example) in which this intake air passage volume is longer than that of the internal combustion engine 10, as shown in FIG. 14, the EGR ratio transiently becomes higher than the misfire limit EGR ratio due to the delay of decrease of the EGR ratio. As a result, combustion deteriorates. In contrast to this, according to the internal combustion engine 10 that can effectively shorten the intake air passage volume described above, the delay of decrease of the EGR ratio can be effectively reduced as shown in FIG. 14.

Figure 15:
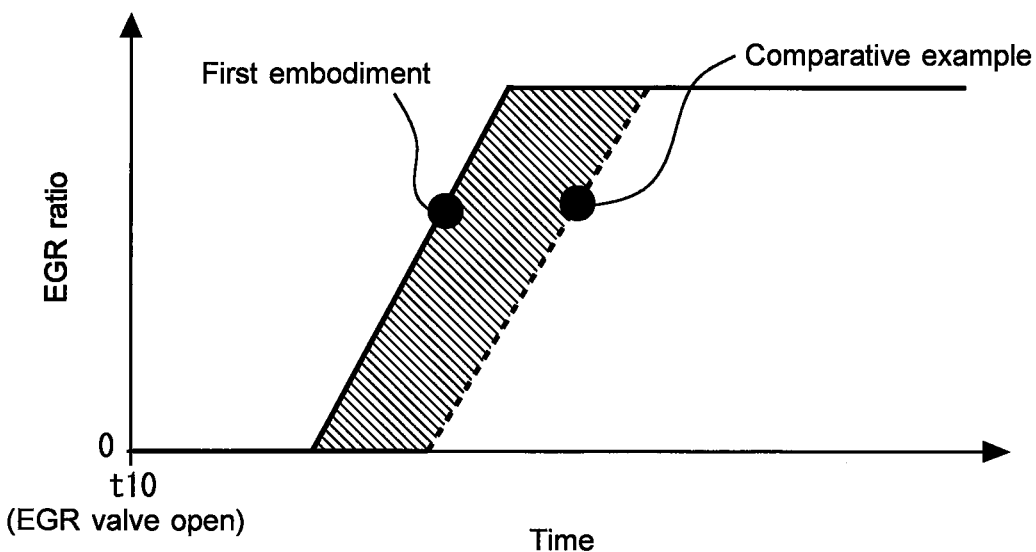
FIG. 15 is a time chart for describing effects of reducing a delay of increase of an EGR ratio from an EGR introduction start.

FIG. 15 is a time chart for describing the effects of reducing a delay of increase of the EGR ratio from an EGR introduction start. A time point t10 corresponds to a time point of an EGR introduction start as a result of the EGR valve 54 being opened. Similarly to the time period of the delay of decrease of the EGR ratio, a time period of the delay of increase of the EGR ratio which is started from an EGR introduction start (or an increase of the amount of the EGR gas introduced) also becomes longer in proportion to the intake air passage volume described above. Thus, according to the internal combustion engine 10 of the present embodiment, as shown in FIG. 15, the delay of increase of the EGR ratio (i.e., delay of arrival of the EGR gas) can also be effectively reduced as compared to the comparative example described above.

Moreover, even in an example in which only the throttle valve 24 is arranged on the intake side as in the internal combustion engine 100 according to the comparative example shown in FIG. 13, if the compressor 102a is arranged on the exhaust side, the distance from the throttle valve 24 to the compressor 102a become longer. Because of this, the distance from the throttle valve 24 to the cylinder 12 cannot be shortened sufficiently. In contrast to this, according to the internal combustion engine 10 of the present embodiment, not only the electric compressor 26a and the EGR introduction port 56 but also the throttle valve 24 are arranged on the intake side (see FIG. 1). Thus, since the distance from the throttle valve 24 to the electric compressor 26a can be made as short as possible, a configuration in which the distance from the throttle valve 24 to the cylinder 12 can also be made as short as possible is achieved. This can improve the responsiveness of the upstream pressure of the electric compressor 26a (i.e., intake air pressure P2) associated with the adjustment of the opening degree of the throttle valve 24 and also the responsiveness of the in-cylinder charge air amount associated with the adjustment of this opening degree.

Figure 16:
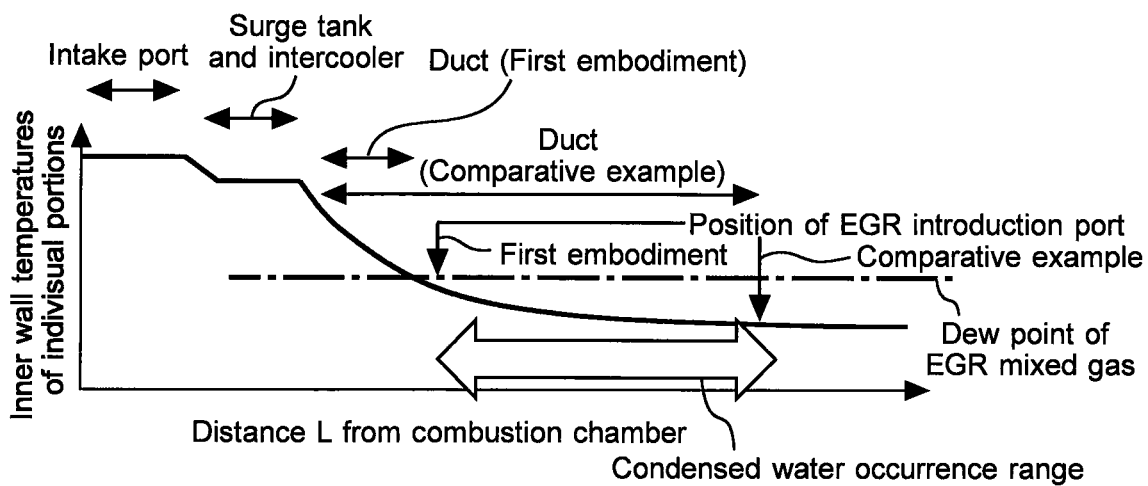
FIG. 16 is a graph that illustrates a distribution of inner wall temperatures of the individual portions of an intake system.

FIG. 16 is a graph that illustrates a distribution of inner wall temperatures of the individual portions of the intake system. The horizontal axis denotes a distance L from the combustion chamber (cylinder 12). FIG. 16 indicates a temperature distribution obtained when the temperatures of the individual temperatures are stable after completion of an engine warm-up under a low outside air temperature. As shown in FIG. 16, when the distance L is longer (that is, when a distance from the engine main body 14 that is a heat source is longer), the inner wall temperature of the intake system becomes lower. In the example shown in FIG. 16, at a part of a duct (which is a portion of the intake system located on the upstream side relative to the surge tank), the inner wall temperature is lower than the dew point of the mixed gas of the fresh air and the EGR gas. If the inner wall temperature is lower than the dew point of this mixed gas, condensed water is produced from the mixed gas that is cooled by the inner wall. There is a possibility that a produced condensed water may adversely affect the combustion and promote corrosion of the individual portions.

According to the internal combustion engine 10, as shown in FIG. 16, as compared to the comparative example (internal combustion engine 100 shown in FIG. 13), the distance L of the EGR introduction port 56 can be shortened and, with this, the length of a duct located on the downstream side of the EGR introduction port 56 can also be shortened. As a result, the portion of the duct in which there is a concern of occurrence of the condensed water can be shortened as shown in FIG. 16, for example. Therefore, according to the internal combustion engine 10 that uses the intake side arrangement described above, the occurrence of the condensed water can be avoided or reduced.

1-4-3. Regenerative Power Generation Region

The non-supercharging region of the internal combustion engine 10 includes, in addition to the low load region (first region and second region) in which the response improvement request is given priority, the medium load region (i.e., regenerative power generation region) which is located on the high load side relative to the low load region and in which the regenerative power generation request is given priority. The electric power used for the driving of the electric compressor 26a is supplied from the battery 30 that stores an electric power generated by the use of the power of the internal combustion engine 10. Because of this, by performing the regenerative power generation, the amount of the power generation using the power of the internal combustion engine 10 can be decreased. This leads to improvement of the fuel efficiency.

1-4-4. Advantageous Effects on Control of Throttle Valve and Electric Supercharger in Transitioning from Low Load Region to Medium Load Region As described with reference to FIG. 11, according to the present embodiment, in transitioning from the low load region to the medium load region, the "regenerative power generation start processing" is executed after the torque request is satisfied first by the "fresh air increment processing". The regenerative power generation start processing is executed as a processing for a duration until maximization of the pressure difference before and after the electric compressor 26a is obtained for an efficient regenerative power generation. According to the regenerative power generation start processing, the throttle valve 24 is gradually opened toward the second target opening degree and the power regeneration load of the electric supercharger 26 is gradually increased toward the target power regeneration load, while satisfying (maintaining) the required in-cylinder charge air amount. As a result, the operating state of the throttle valve 24 and the electric supercharger 26 can be properly shifted such that an efficient regenerative power generation becomes possible by maximizing the pressure difference before and after the electric compressor 26a, while reducing a change of the in-cylinder charge air amount from a required value (and also a change of the engine torque in accompaniment therewith).

1-5. Modification Examples Concerning First Embodiment

In the first embodiment described above, all of the EGR introduction port 56, the electric compressor 26a and the throttle valve 24 are arranged on the "intake side". This arrangement can also achieve the above-described effects due to the shortening of the distance from the throttle valve 24 to the electric compressor 26a. However, components arranged on the "intake side" may be only the EGR introduction port 56 and the electric compressor 26a of these three components. According to this kind of example, similarly to the first embodiment, the advantageous effects described above (i.e., improvement of each of the responsiveness of the supercharging pressure and the responsiveness of the EGR ratio, and reduction of the condensed water) can be achieved.

Moreover, in order to achieve the advantageous effects concerning the improvement of the supercharging response described above, the "intake side" described above may not always be provided. That is to say, an internal combustion engine for achieving this advantageous effects may be, for example, configured as follows, as long as: an EGR introduction port is arranged on the upstream side of an electric supercharger; and a throttle valve is arranged on the upstream side of the EGR introduction port. In other words, an internal combustion engine for achieving the advantageous effects described above may include a turbo-supercharger in addition to an electric supercharger, and in this internal combustion engine, at least one of the electric supercharger and an EGR introduction port may be arranged on the exhaust side as well as a compressor of the turbo-supercharger. Alternatively, an electric supercharger which an internal combustion engine includes in order to achieve the advantageous effects described above may be an electrically assisted turbo-supercharger that uses the exhaust gas of the internal combustion engine as its power source, and a compressor of this turbo-supercharger may be arranged on the exhaust side.

Furthermore, in the first embodiment, the example in which the low load region where the response improvement request is given priority includes the first region and the second region has been described. However, instead of this kind of example, an arrangement may be adopted such that only any one of the first and second regions is included in the non-supercharging region. Furthermore, in the non-supercharging region, the regenerative power generation region may not always be provided, and thus, the whole non-supercharging region may be, for example, consist of at least one of the first and second regions.

2. Second Embodiment

Next, a second embodiment according to the present embodiment will be described with reference to FIGS. 17 and 18. It is supposed that, in the following explanation, the configuration shown in FIG. 1 is used as an example of the configuration of a system according to the second embodiment.

2-1. Control of Throttle Valve and Electric Supercharger

The control of the throttle valve 24 and the electric supercharger 26 according to the present embodiment is similar to the control according to the first embodiment, except for a point described below. That is to say, according to the present embodiment, the contents of the control performed in the low load region (see FIG. 2) in which the response improvement request is given priority is changed in accordance with whether or not a "temperature correlation value" is greater than or equal to a predetermined threshold value.

The temperature correlation value mentioned here corresponds to a value correlated with the temperature of the gas in an "EGR convergence portion" at which the EGR gas introduced in the intake air passage 16 from the EGR introduction port 56 converges with the intake air. According to the present embodiment, an outside air temperature detected by the outside air temperature sensor 66 is used as an example of the temperature correlation value. It should be noted that the EGR passage 52 around the EGR introduction port 56 and the intake air passage 16 correspond to the EGR convergence portion described above.

2-1-1. Outline of Control of Throttle Valve and Electric Supercharger Under Extremely Low Temperature Specifically, when the outside air temperature is lower, the intake air temperature becomes lower. As a result, the fresh air temperature at the EGR convergence portion also becomes lower. When the temperature of the mixed gas falls below the dew point or lower as a result of low-temperature fresh air and EGR gas being mixed with each other at the EGR convergence portion, condensed water is produced. In addition, there is a concern that, when the outside air temperature is lower than or equal to zero degrees C., the produced condensed water may freeze.

According to the present embodiment, under the extremely low temperatures in which the outside air temperature is lower than or equal to zero degrees C., introduction of the EGR gas is supposed not to be introduced (that is, an "EGR valve closing condition" that the EGR valve 54 is closed is met) as a premise. Moreover, during use of the low load region in which the response improvement request is given priority, the intake air pressure P2 (that is, intake air pressure near the EGR introduction port 56) is put in the strong negative pressure state as a result of the throttle valve 24 being closed as already described. As a result, during use of this kind of low load region, since, even if the EGR valve 54 is closed, the EGR convergence portion is put in the strong negative pressure state, the EGR gas becomes easy to be leaked out from the EGR valve 54 into the EGR convergence portion. Also, there is a concern that, if the EGR gas is leaked out in this way under the extremely low temperature, moisture included in the EGR gas which has been leaked out may be condensed. Furthermore, there is a concern that, if the outside air temperature is lower than or equal to zero degrees C., the condensed water derived from the moisture which has been leaked out may freeze.

Figure 17:
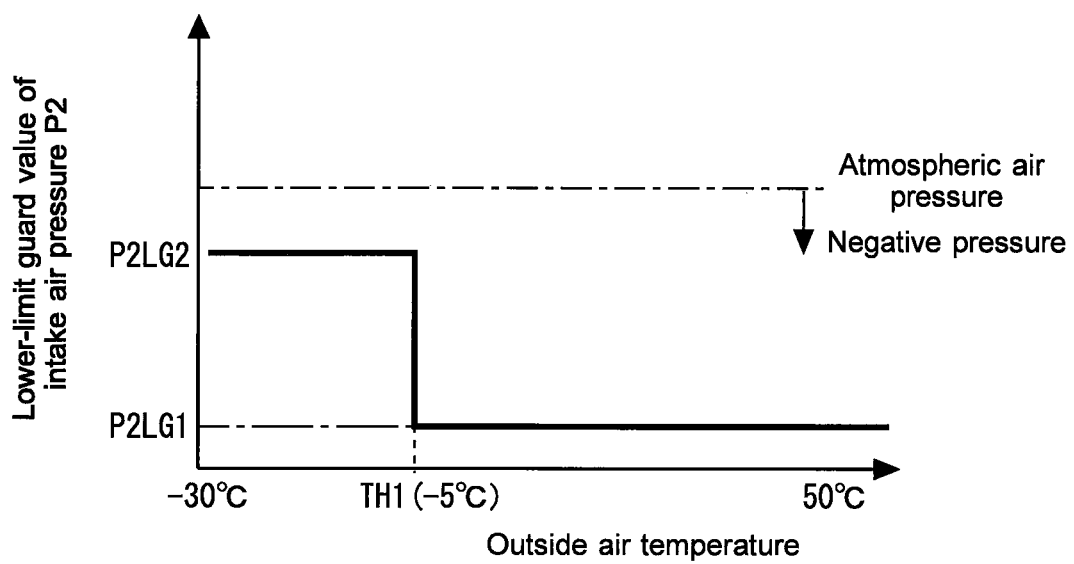
FIG. 17 is a graph for describing a characteristic portion of a control of the throttle valve and the electric supercharger under an extremely low temperature according to a second embodiment of the present disclosure.
Figure 18:
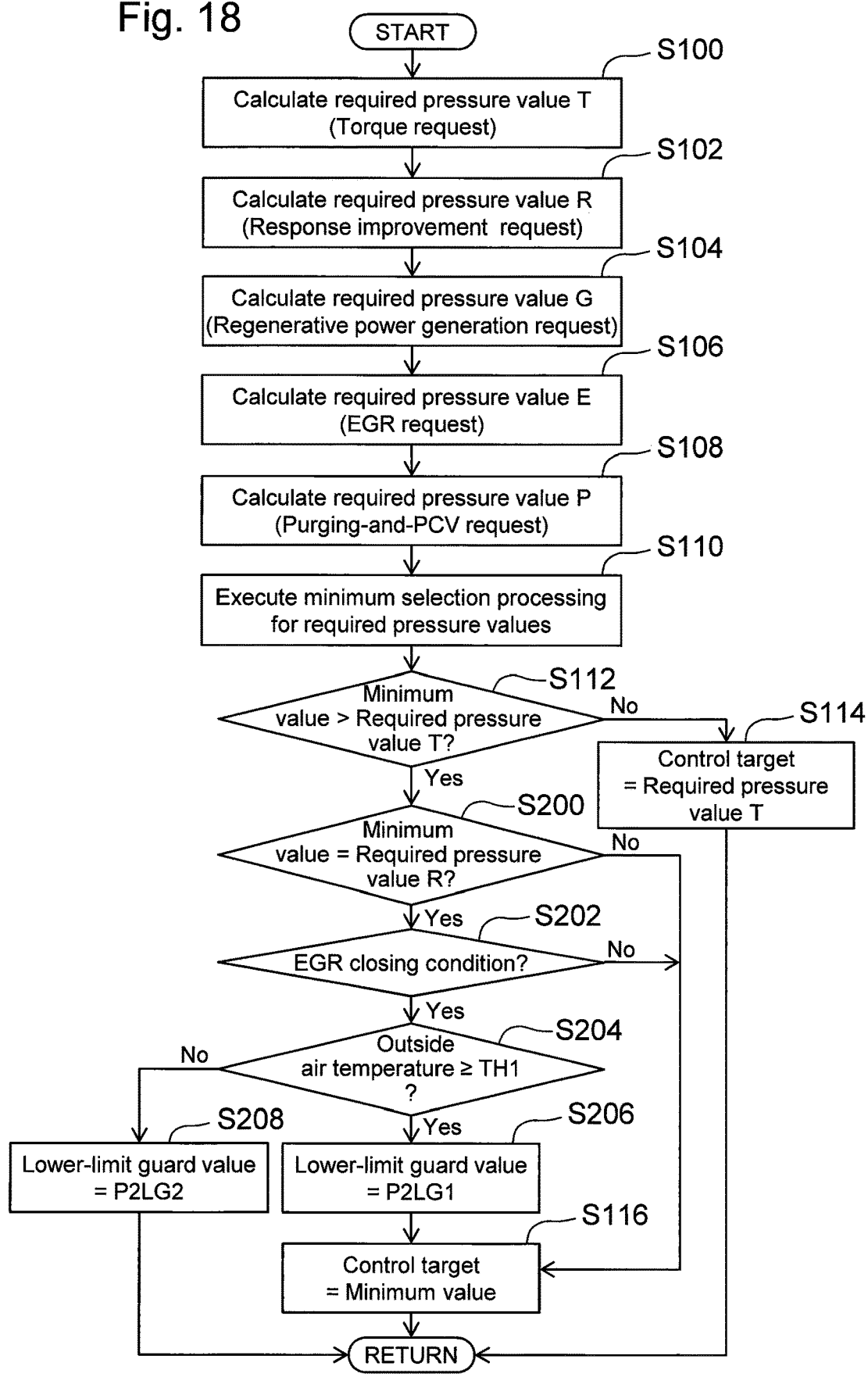
FIG. 18 is a flow chart that illustrates a routine of the processing concerning the control of the throttle valve and the electric supercharger according to the second embodiment of the present disclosure.

FIG. 17 is a graph for describing a characteristic portion of the control of the throttle valve 24 and the electric supercharger 26 under the extremely low temperature according to the second embodiment of the present disclosure. In FIG. 17, a relationship between a lower limit guard value of the intake air pressure P2 and the outside air temperature is represented. According to the present embodiment, in view of the above-described issue that occurs in accompaniment with execution of the control of the intake air pressure P2 (i.e., first or second intake air flow rate adjusting processing) for generating the strong negative pressure state according to the first embodiment, the following control is additionally executed with respect to the control according to the first embodiment.

That is to say, if the EGR closing condition is met and the outside air temperature is higher than or equal to a predetermine threshold value TH1 (for example, −5 degrees C.), P2LG1 that is a negative value is selected as a lower limit guard value of the intake air pressure P2. This lower limit guard value P2LG1 corresponds to a value that is sufficiently lower than the target value of the intake air pressure P2 selected in the control of the intake air pressure P2 (i.e., first or second intake air flow rate adjusting processing) for generating the strong-negative-pressure state during use of the low load region (first region or second region). Thus, the control of the intake air pressure P2 is executed without limitation, similarly to the first embodiment.

On the other hand, in an example in which the EGR closing condition is met and the outside air temperature is lower than the threshold value TH1, P2LG2 is selected as the lower limit guard value of the intake air pressure P2. This lower limit guard value P2LG2 corresponds to a value that is greater than the P2LG1 described above and lower than the atmospheric air pressure. In this example, in order to cause the intake air pressure P2 to approach the lower limit guard value P2LG2, the throttle valve 24 is opened, and the power regeneration load of a magnitude required to reduce an increase of the in-cylinder charge air amount as a result of the throttle valve 24 being opened in this way is applied to the MG 26b (electric supercharger 26). It should be noted that the processing executed by the use of the throttle valve 24 and the electric supercharger 26 in this way corresponds to an example of the "third air flow rate adjusting processing" according to the present disclosure.

2-1-2. Processing of Control Device Concerning Control of Throttle Valve and Electric Supercharger FIG. 18 is a flow chart that illustrates a routine of the processing concerning the control of the throttle valve 24 and the electric supercharger 26 according to the second embodiment of the present disclosure. The processing of steps S100 to S116 in the routine shown in FIG. 18 is as already described in the first embodiment.

According to the routine shown in FIG. 12, if the determination result of step S112 is positive (minimum value>required pressure value T), the control device 60 proceeds to step S200. In step S200, the control device 60 determines whether or not the required pressure value R corresponds to the minimum value. As a result, if this determination result is negative, that is, if the low load region in which the response improvement request is given priority is not in use, the control device 60 proceeds to step S116.

If, on the other hand, the determination result of step S200 is positive, that is, if the low load region in which the response improvement request is given priority is in use, the control device 60 proceeds to step S202. In step S202, the control device 60 determines whether or not the EGR closing condition is met.

If the determination result of step S202 is negative, the control device 60 proceeds to step S116. If, on the other hand, the determination result of step S202 is positive, the control device 60 proceeds to step S204. In step S204, the control device 60 determines whether or not the outside air temperature is higher than or equal to the threshold value TH1.

If the determination result of step S204 is positive, that is, if it can be judged that, even if the EGR gas is leaked out from the EGR valve 54 due to the generation of the strong negative pressure state, there is no or low concern about freezing of the moisture, the control device 60 proceeds to step S206. In step S206, the control device 60 selects P2LG1 (see FIG. 17) as the lower limit guard value of the intake air pressure P2. Thereafter, the processing proceeds to step S116.

If the determination result of step S204 is negative, that is, if it can be judged that there is high concern about the freezing of the moisture in the EGR gas which has been leaked out, the control device 60 proceeds to step S208. In step S208, the control device 60 selects P2LG2 (see FIG. 17) as the lower limit guard value of the intake air pressure P2. As a result, the throttle valve 24 is controlled (i.e., opened) such that the intake air pressure P2 approaches the lower limit guard value P2LG2. Also, the power regeneration load of a magnitude required to reduce an increase of the in-cylinder charge air amount as a result of the throttle valve 24 being opened in this way is applied to the MG 26b. As just described, if the processing proceeds to step S208, the control of the intake air pressure P2 for the generation of the strong negative pressure state is not performed.

2-2. Advantageous Effects Concerning Control of Throttle Valve and Electric Supercharger As described so far, according to the control of the present embodiment, if the EGR closing condition is met and the outside air temperature is lower than the threshold value TH1 during use of the low load region shown in FIG. 2, the throttle valve 24 is opened so as to be greater than an opening degree used when the outside air temperature (i.e., temperature correlation value) is higher than or equal to the threshold value TH1 under the same engine load. As a result, since the intake air pressure P2 is not caused to be greatly negative, a pressure difference before and after the EGR valve 54 becomes smaller. Thus, leakage of the EGR gas from the EGR valve 54 which is closed is reduced. In addition, the power regeneration load is applied to the MG 26b, whereby an increase of the in-cylinder charge air amount as a result of the throttle valve 24 being opened is reduced.

2-3. Modification Examples Concerning Second Embodiment 2-3-1. Another Example of "Temperature Correlation Value"

In the second embodiment described above, the outside air temperature is used as an example of the "temperature correlation value" correlated with the temperature of the gas at the EGR convergence portion. However, the "temperature correlation value" according to the present disclosure may be, for example, the temperature of a gas immediately after the EGR valve 54 that is directly detected by a temperature sensor, instead of the above-described example of the outside air temperature.

2-3-2. Another Example of "Threshold Value" for Evaluating Temperature Correlation Value In the second embodiment described above, the threshold value TH1 (−5 degrees C.) lower than or equal to zero degrees C. is used as an "threshold value" for evaluating the temperature correlation value. However, this "threshold value" may not always be values lower than or equal to zero degrees C., as long as it is lower than or equal to the dew point of the mixed gas of the fresh air and the EGR gas. Thus, in order to not only reduce freezing the moisture leaked out from the EGR valve 54 but also reduce the occurrence itself of the condensed water from the moisture that has been leaked out, a value that is lower than or equal to the dew point described above and higher than zero degrees C. may alternatively be used as the threshold value described above.

3. Other Embodiments

In the first and second embodiments, the example of the in-line three-cylinder internal combustion engine 10 has been described. However, the number and arrangement of cylinders of an internal combustion engine according to the present disclosure are not particularly limited in terms of achieving the advantageous effects concerning the improvement of the supercharging response. Moreover, the application of the above-described "intake side arrangement" to a V-type engine can be performed as follows, for example. That is to say, in a V-type engine having a configuration in which intake system parts (more specifically, intake system parts shared by two bunks) are arranged between the two bunks, at least an electric compressor and an EGR introduction port out of the electric compressor, the EGR introduction port and a throttle valve may be arranged on the "intake side" when viewed from the axial direction of a cylinder in each bunk. Furthermore, in a V-type engine having a configuration in which exhaust system parts are arranged between two bunks and intake system parts are arranged separately for each bunk, at least an electric compressor and an EGR introduction port may be arranged on the "intake side" in each bunk when viewed from the axial direction of a cylinder in each bunk.

The embodiments and modification examples described above may be combined in other ways than those explicitly described above as required and may be modified in various ways without departing from the scope of the present disclosure.

What is claimed is:

1. An internal combustion engine, comprising:
an electric supercharger including an electric compressor arranged in an intake air passage;
an exhaust gas recirculation ("EGR") introduction port formed at a portion of the intake air passage located on an upstream side of the electric compressor;
a throttle valve A arranged in a portion of the intake air passage located on an upstream side of the EGR introduction port; and
an ECU configured to control the electric supercharger and the throttle valve A,
wherein a throttle valve B other than the throttle valve A is not arranged in the intake air passage, and
wherein the ECU is configured, in a non-supercharging region in which an outlet pressure of the electric compressor is lower than or equal to an atmospheric air pressure, to execute:
a first air flow rate adjustment processing that adjusts an intake air flow rate by adjusting an opening degree of the throttle valve A while driving the electric supercharger to cause a ratio of an outlet pressure of the electric compressor to an inlet pressure of the electric compressor between the throttle valve A and the electric compressor to remain approximately 1, such that a pressure loss of intake air is prevented from being produced due to the intake air passing through the electric compressor; and
after the first air flow rate adjustment processing, a second air flow rate adjustment processing that adjusts the intake air flow rate by adjusting the opening degree of the throttle valve A while not energizing the electric supercharger.

2. The internal combustion engine according to claim 1, wherein, when, in a view of the internal combustion engine from an axial direction of a cylinder, a side of an intake port is referred to as an intake side of the cylinder and a side opposite to the intake side with respect to a center of the cylinder is referred to as an exhaust side of the cylinder, the electric supercharger and the EGR introduction port are arranged on the intake side,
wherein the electric supercharger does not use exhaust gas of the internal combustion engine as a power of the electric supercharger, and
wherein the internal combustion engine does not include a supercharger other than the electric supercharger.

3. The internal combustion engine according to claim 2, wherein the throttle valve A is arranged on the intake side as well as the electric compressor and the EGR introduction port.

4. The internal combustion engine according to claim 1, wherein the non-supercharging region includes:
at least one of a first region in which the first air flow rate adjustment processing is executed and a second region in which the second air flow rate adjustment processing is executed; and
a regenerative power generation region which is located on a high-load side relative to the first region and the second region and in which regenerative power generation using the electric supercharger is performed, and wherein the ECU is configured, in the regenerative power generation region, to adjust the opening degree of the throttle valve A and power regeneration load of the electric supercharger to adjust the intake air flow rate.

5. The internal combustion engine according to claim 4, wherein the non-supercharging region includes the first region, the second region and the regenerative power generation region in order from a low-load side.

6. The internal combustion engine according to claim 5, wherein the ECU is configured, in transitioning to the regenerative power generation region from the first region or the second region, to:

before applying the power regeneration load to the electric supercharger, execute a fresh air increment processing that opens the throttle valve A toward a first target opening degree required to obtain a required in-cylinder charge air amount required to achieve a required engine torque in the regenerative power generation region; and execute a regenerative power generation start processing that, after execution of the fresh air increment processing, gradually opens the throttle valve A toward a second target opening degree greater than the first target opening degree and gradually increases the power regeneration load of the electric supercharger toward a target power regeneration load while satisfying the required in-cylinder charge air amount, and wherein the second target opening degree and the target power regeneration load are determined to maximize a pressure difference before and after the electric compressor while satisfying the required in-cylinder charge air amount.

7. The internal combustion engine according to claim 4, wherein the ECU is configured, in transitioning to the regenerative power generation region from the first region or the second region, to:

before applying the power regeneration load to the electric supercharger, execute a fresh air increment processing that opens the throttle valve A toward a first target opening degree required to obtain a required in-cylinder charge air amount required to achieve a required engine torque in the regenerative power generation region; and execute a regenerative power generation start processing that, after execution of the fresh air increment processing, gradually opens the throttle valve A toward a second target opening degree greater than the first target opening degree and gradually increases the power regeneration load of the electric supercharger toward a target power regeneration load while satisfying the required in-cylinder charge air amount, and wherein the second target opening degree and the target power regeneration load are determined to maximize a pressure difference before and after the electric compressor while satisfying the required in-cylinder charge air amount.

8. The internal combustion engine according to claim 1, wherein the throttle valve B is an EGR valve configured to open and close an EGR passage provided with the EGR introduction port as an end of the EGR passage, and wherein the ECU is configured, during use of the non-supercharging region, to:

where an EGR closing condition that the EGR valve is closed is met and a temperature correlation value correlated with a temperature of a gas at an EGR convergence portion at which EGR gas introduced from the EGR introduction port into the intake air passage converges with intake air is greater than or equal to a threshold value, execute the first air flow rate adjustment processing or the second air flow rate adjustment processing; and where the EGR closing condition is met and the temperature correlation value is smaller than the threshold value, execute a third air flow rate adjustment processing that adjusts the opening degree of the throttle valve A so as to become greater than an opening degree used when the temperature correlation value is greater than or equal to the threshold value under a same engine load and that applies, to the electric supercharger, a power regeneration load required to reduce an increase of an in-cylinder charge air amount associated with an increase of the opening degree of the throttle valve A.

* * * * *